United States Patent [19]

Priest

[11] Patent Number: 5,403,177

[45] Date of Patent: Apr. 4, 1995

[54] INJECTION STRETCH BLOW MOLDING MACHINE

[75] Inventor: Walter L. Priest, Egg Harbor, N.J.

[73] Assignee: Jomar Corporation, Pleasantville, N.J.

[21] Appl. No.: 93,203

[22] Filed: Jul. 16, 1993

[51] Int. Cl.6 .................... B29C 49/12; B29C 49/36

[52] U.S. Cl. .................... 425/529; 264/532; 264/538; 425/533; 425/534; 425/540

[58] Field of Search ............... 425/534, 529, 533, 540; 264/531, 532, 538

[56] References Cited

U.S. PATENT DOCUMENTS

| | | | |
|---|---|---|---|
| 3,857,660 | 12/1974 | Flynn et al. | 425/525 |
| 4,057,609 | 11/1977 | Uhlig | 425/533 X |
| 4,065,246 | 12/1977 | Marcus | 425/528 |
| 4,105,391 | 8/1978 | Aoki | 425/526 |
| 4,144,013 | 3/1979 | Simmons | 425/533 |
| 4,151,247 | 4/1979 | Hafele | 264/535 X |
| 4,239,475 | 12/1980 | Rainville | 425/526 |
| 4,251,203 | 2/1981 | Oas | 425/534 X |
| 4,280,805 | 7/1981 | Hafele | 425/525 |
| 4,285,657 | 8/1981 | Ryder | 425/525 |
| 4,310,282 | 1/1982 | Spurr et al. | 414/753 |
| 4,321,029 | 3/1982 | Aoki | 425/523 |
| 4,332,544 | 6/1982 | Aoki | 425/529 |
| 4,344,749 | 8/1982 | Fritz et al. | 425/174.4 |
| 4,363,619 | 12/1982 | Farrell | 425/525 |
| 4,375,947 | 3/1983 | Marcus | 425/143 |
| 4,379,688 | 4/1983 | Tate et al. | 425/526 |
| 4,409,161 | 10/1983 | Harry et al. | 264/40 |
| 4,412,806 | 11/1983 | Gaiser et al. | 425/554 |
| 4,419,485 | 12/1983 | Borman et al. | 525/437 |
| 4,422,843 | 12/1983 | Aoki | 425/525 |
| 4,427,359 | 1/1984 | Fukuoka et al. | 425/525 |
| 4,432,530 | 2/1984 | Marcinek | 249/142 |
| 4,437,825 | 3/1984 | Harry et al. | 425/145 |
| 4,457,689 | 7/1984 | Aoki | 425/525 |
| 4,473,515 | 9/1984 | Ryder | 264/28 |
| 4,499,044 | 2/1985 | Höne et al. | 264/521 |
| 4,521,369 | 6/1985 | Marcinek | 264/532 |
| 4,566,871 | 1/1986 | Höne et al. | 425/525 |
| 4,588,620 | 5/1986 | Marcinek | 215/1 C X |
| 4,592,720 | 6/1986 | Dugan et al. | 425/540 X |
| 4,604,044 | 8/1986 | Hafele | 425/525 |
| 4,648,824 | 3/1987 | Aoki | 425/150 |
| 4,726,756 | 2/1988 | Aoki | 425/526 |
| 4,741,688 | 5/1988 | Aoki | 425/526 |
| 4,744,742 | 5/1988 | Aoki | 425/126.1 |
| 4,747,769 | 5/1988 | Nakamura et al. | 425/529 |
| 4,790,741 | 12/1988 | Takakusaki et al. | 425/526 |
| 4,941,816 | 7/1990 | Aoki et al. | 425/533 |
| 4,946,367 | 8/1990 | Nakamura | 425/533 |
| 5,061,173 | 10/1991 | Julian et al. | 425/525 |

FOREIGN PATENT DOCUMENTS

| | | |
|---|---|---|
| 0426096 | 5/1991 | European Pat. Off. |
| 2537185 | 3/1976 | Germany. |
| 2017565 | 10/1979 | United Kingdom. |

OTHER PUBLICATIONS

Patent Abstracts of Japan, vol. 7, No. 47 (M-196)(1192) 24 Feb. 1983 & JP 57 195 627 (Sumitomo Jukikai) 1 Dec. 1982.

Procrea ISB 250 literature, undated.

*Primary Examiner*—Richard L. Chiesa
*Attorney, Agent, or Firm*—Seidel Gonda Lavorgna & Monaco

[57] ABSTRACT

A two station machine forms a parison from a plastic resin and then stretch blowing into a hollow-molded product. The machine has a preform station for forming a parison and a blow mold station for stretching and inflating the parison into the hollow molded object and then ejecting the hollow-molded product from the machine. The preform station and the blow mold station are disposed at diametrically opposite locations on a circumference of a circle. A transfer portion has a transfer head rotatable about an axis extending through the center of the circle and having a pair of identical transfer stations located at diametrically opposite locations with respect to the axis. An indexer rotates the transfer head between two aligned positions in which one of the transfer stations is in registry with the preform station and the other transfer station is in registry with the blow mold station. Each transfer station has at least one parison engaging and retaining neck mold for engaging the parison formed at the preform station and retaining the parison for transfer from the preform station to the blow mold station upon rotation of the transfer portion from one to other of the two positions.

17 Claims, 19 Drawing Sheets

INJECTION STRETCH BLOW MOLDING MACHINE

FIELD OF THE INVENTION

This invention relates to an injection stretch blow molding machine, and more particularly to a two-station machine wherein the second station is capable of stretching and blowing the parison into a hollow-molded product, and then ejecting the hollow-molded product from the machine.

BACKGROUND OF THE INVENTION

It is known to have blow molding machines wherein a plastic resin is converted into a hollow-molded product. A parison is formed at a first station. The parison is moved to a second station where the finished product is formed. The finished product is then moved to a third station where it is ejected from the machine. Sometimes, additional intermediate stations are employed, and machines having four stations are not uncommon. A transfer plate or disk rotates in relation to the stations to move the parison through the stations to form the finished product and then eject it from the machine. The rotating transfer plate or disk has molds to hold a portion of the parison, usually the upper or neck portion, as it moves the parison from station to station.

It is also known to form multiple products at the same station at the same time. The mold cavities in the blow mold section typically are in two rows, where the first row is radially inward of the second row. The mold has a pair of mold halves defining the cavity which open and close radially. Thus, the mold halves in the closed position must be sufficiently spaced from the center of the disk to allow the mold half to move radially inward upon opening.

It would be desirable to have an injection stretch blow molding machine requiring fewer than three stations in order to minimize machine size and time spent transferring the parison from station to station.

SUMMARY OF THE INVENTION

This invention provides a machine for forming hollow molded objects by injection stretch blow molding. The machine has a preform station for forming a parison and a blow mold station for stretching and inflating the parison into the hollow molded object and then ejecting the hollow-molded product from the machine. The preform station and the blow mold station are disposed at diametrically opposite locations on a circumference of a circle. A transfer portion has a transfer head rotatable about an axis extending through the center of the circle and having a pair of identical transfer stations located at diametrically opposite locations with respect to the axis. An indexer rotates the transfer head between two aligned positions in which one of the transfer stations is in registry with the preform station and the other transfer station is in registry with the blow mold station. Each transfer station has at least one parison engaging and retaining neck mold for engaging the parison formed at the preform station and retaining the parison for transfer from the preform station to the blow mold station upon rotation of the transfer portion from one to another of the two positions.

In the preferred embodiment of the present invention, the transfer portion includes a generally horizontal transfer head and a transfer shaft extending vertically through the transfer head defining a vertical axis. The transfer shaft has an indexing gear at a lower end for coupling with the indexer and a lifting hub located in proximity to an upper end. The identical transfer stations are located 180° from each other on the transfer head about the vertical axis and spaced equal distances radially from the vertical axis. Each station of the transfer head has six neck molds located in two rows of three. Each neck mold has two halves which move between an open position and a closed position.

The preform station has a preform mold below the transfer head and a preform moving platen movable between a raised position and a lowered position. The preform mold has a plurality of resin injection openings which are aligned with each of the neck molds when one of the stations of the transfer head is aligned with the preform station. The preform moving platen has a preform core pin depending downward to extend between the neck mold halves of the neck mold in the closed position and into the injection opening when the transfer head and the preform moving platen are in the lowered position for forming the parison retained by the neck mold.

The blow mold station has a stretch blow mold below the transfer head and a blow mold moving platen movable between a raised position and a lowered position. The stretch blow mold has a pair of mold halves defining a plurality of mold cavities aligned with each of the neck molds for receiving the parison. The mold halves move between a closed position engaging each other for stretching and blowing the parison into the hollow-molded product and an open position for ejecting the hollow-molded product. The blow mold moving platen has a blow core pin depending downward between the neck mold halves to seal the parison in the neck mold. Each blow core pin has a stretch rod extending through a bore and movably mounted to the blow mold moving platen for movement between a retracted position, an extended position for stretching the parison and an ejection position for ejecting the hollow-molded product, whereby the stretch rod stretches the parison, the blow core pin inflates the parison into the hollow-molded product and then the hollow-molded product is ejected from the machine by the stretch rod.

The stretch blow mold has a bottom plug pivotable between a closed position interposed between the mold halves and an open position spaced from the mold halves to facilitate ejection of the hollow-molded product.

The transfer head moves between the raised position and the lowered position with the blow mold moving platen. A pair of links, each mounted at a first end to the blow mold moving platen and at a second end are selectively rigidly positioned relative to the frame in proximity to the preform moving platen. A cam roller rotatably mounted on the link is generally located intermediate the ends and slideably received by the lifting hub on the transfer shaft. Movement of the blow mold moving platen moves the links and thereby the transfer head.

BRIEF DESCRIPTION OF THE DRAWINGS

For the purpose of illustrating the invention, there is shown in the drawings a form which is presently preferred; it being understood, however, that this invention is not limited to the precise arrangement and instrumentality shown.

DESCRIPTION OF THE PREFERRED EMBODIMENTS

Figure 1:
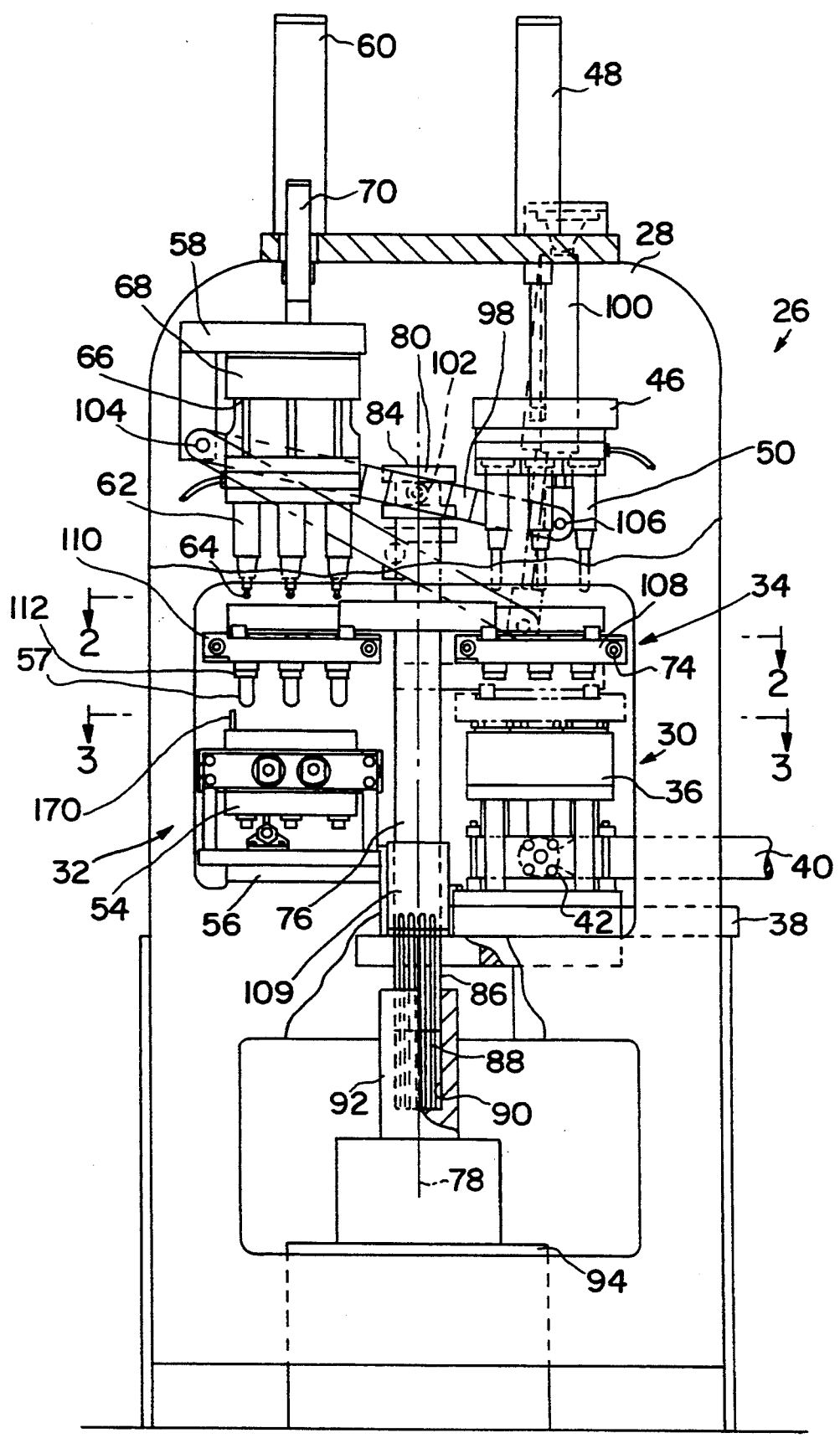
FIG. 1 is a side elevation of a machine in accordance with the present invention with the front frame broken away at the top. The alignment cylinder and links are shown in phantom in the lowered operating position.

Referring to the drawings, where like elements are identified by like numerals, there is shown in FIG. 1, a preferred embodiment of an injection stretch blow molding machine according to the invention designated by the numeral 26. For clarity, some elements are not shown in all figures. The machine 26 includes a frame 28, a preform station 30, a blow mold station 32, and a transfer portion 34.

The preform station 30 has a preform mold 36 mounted on a lower preform platen 38 connected to an injection device, not shown, by a primary nozzle 40 and a manifold 42. A plastic resin is melted in the injection device and extruded and forced towards the preform mold 36.

Figure 4:
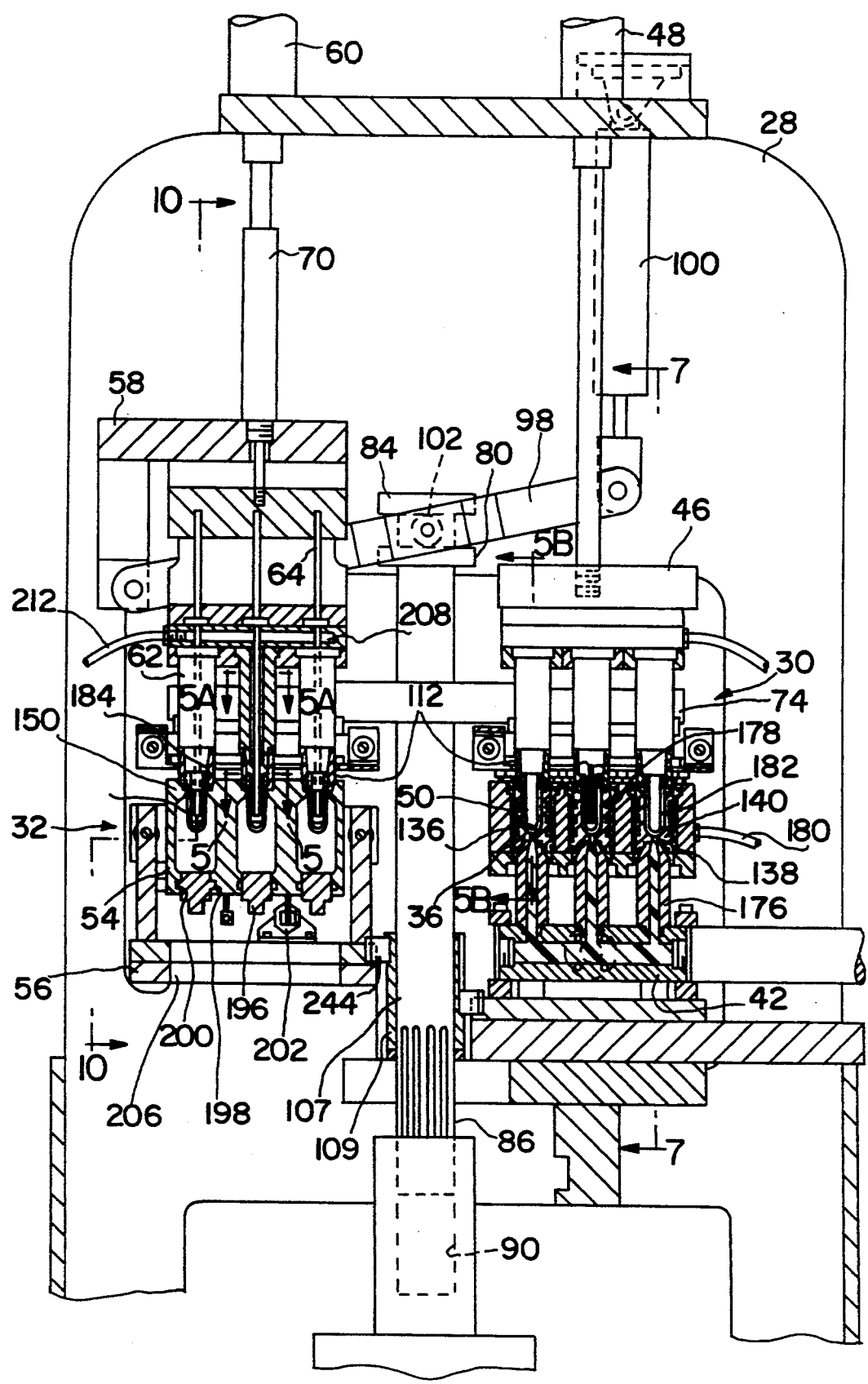
FIG. 4 is a section of the top portion of the machine in a lowered operating position.

The preform station 30 has a preform moving platen 46 which is movable between a raised position and a lowered operating position (the lowered operating position is shown in FIG. 4) wherein the movement is controlled by a pair of preform cylinders 48 secured to the frame 28. The preform moving platen 46 has six preform core pins 50 depending downward into the preform mold 36 when in the lowered operating position to form parisons 57, shown at blow mold station 32 for clarity.

Figure 6:
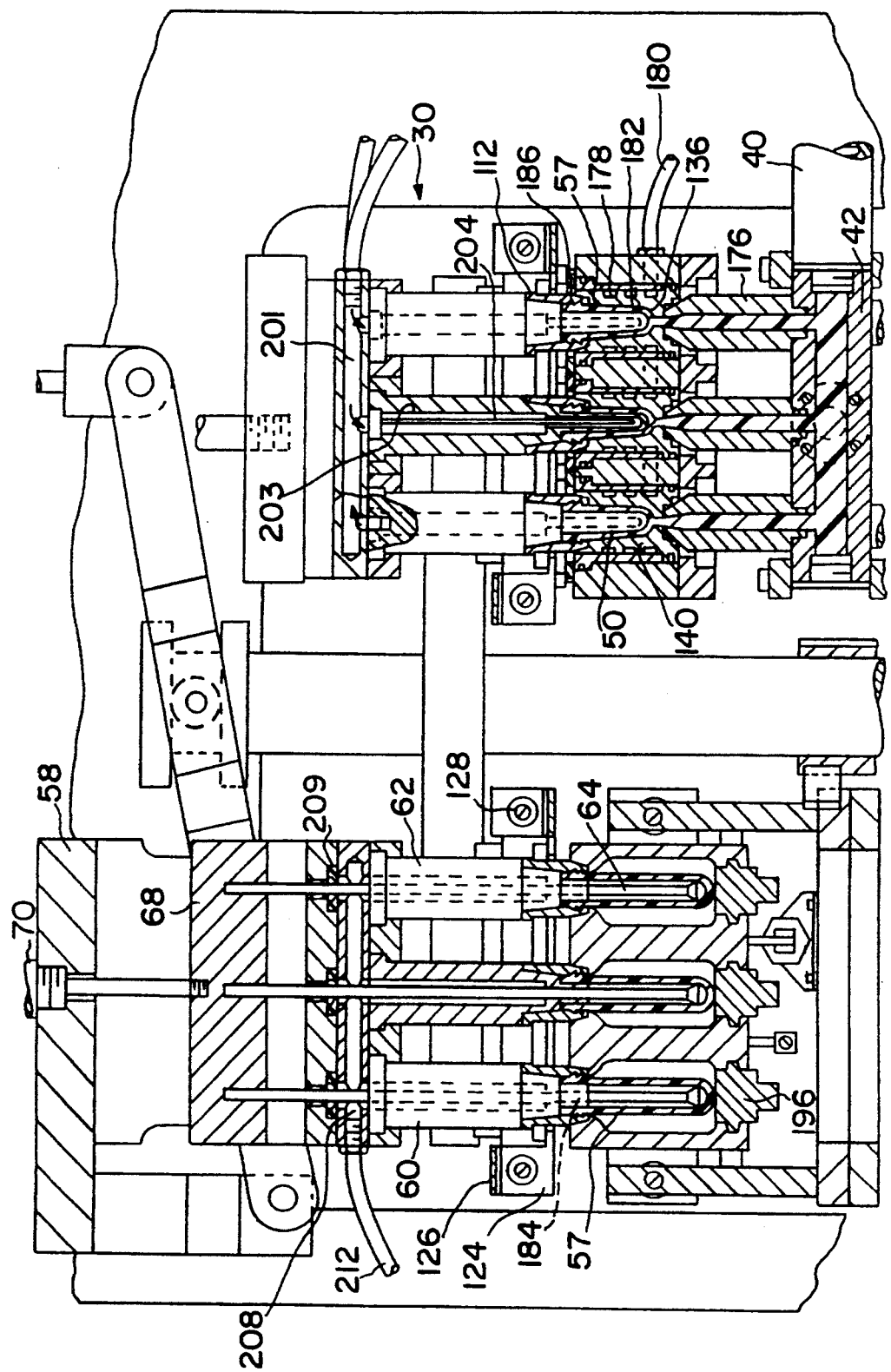
FIG. 6 is an enlarged section view of the preform and blow mold stations in the lowered operating position.
Figure 11:
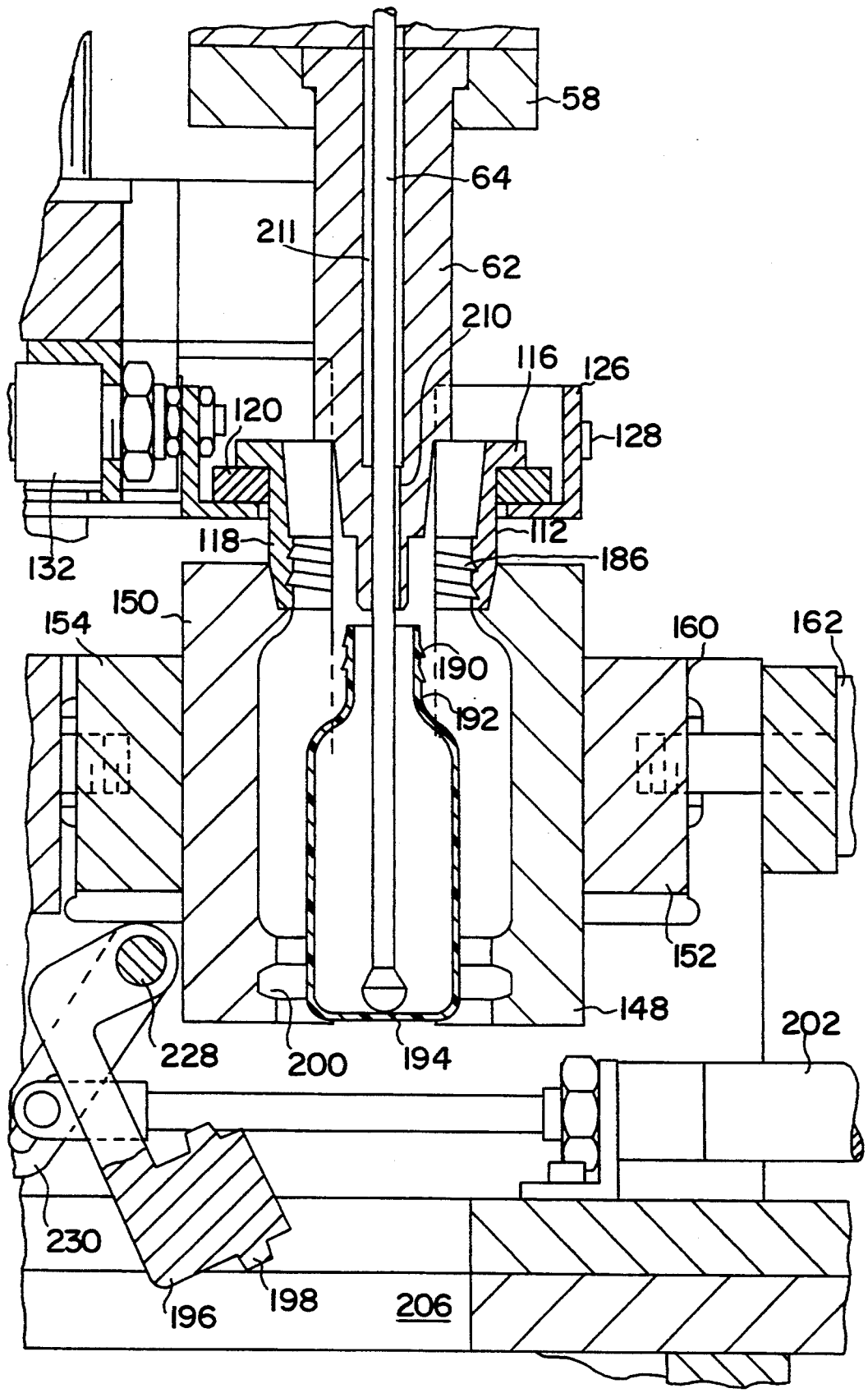
FIG. 11 is an enlarged cross-sectional view of ejecting the hollow-molded product from one of the blow molds in the blow mold station.
Figure 12:
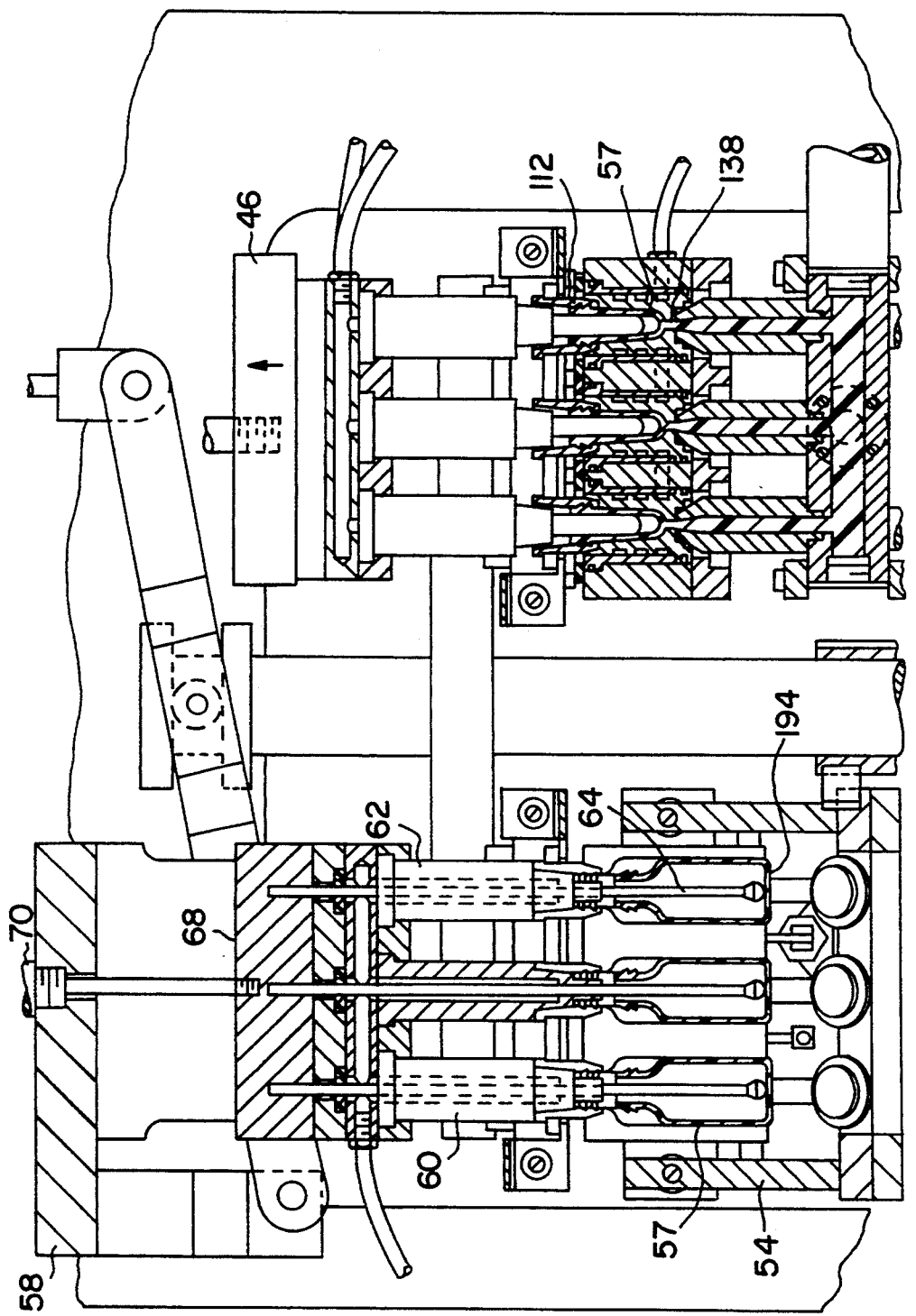
FIG. 12 is a view similar to FIG. 9 with the stretch rods of the blow mold station in an ejection position and the preform station moving towards the raised position.

The blow mold station 32 has a stretch blow mold 54 mounted to a blow bottom platen 56 for receiving parisons 57 formed at the preform station 30. A blow mold moving platen 58 of the blow mold station 32 is movable between a raised position and a lowered operating position (the lowered operating position is shown in FIG. 4) wherein the movement is controlled by a blow mold cylinder 60. The blow mold moving platen 58 has six blow core pins 62 depending downward in an arrangement similar to that of the preform core pins 50 of the preform station 30 for inflating the parisons 57. Each blow core pin 62 has a stretch rod 64 whose upper end 66 is attached to a stretch rod plate 68. The stretch rods 64 move between a raised position (as shown in FIG. 1) and an ejection position (as shown in FIGS. 11 and 12) for ejecting the hollow-molded product 194 and through an extended position (as shown in FIG. 6) for stretching the parisons 57 prior to or concurrent with inflating the parisons 57. The stretch rods 64 are moved by a pair of stretch rod cylinders 70 mounted to the upper portion of the blow mold moving platen 58 and extending to the stretch rod plate 68. The cylinders 70 extend, pushing the stretch rod plate 68 downward, to extend the stretch rods 64 to the extended position.

Referring back again to FIG. 1, the transfer portion 34 has a generally horizontal transfer head 74 and a transfer shaft 76 extending vertically through the transfer head 74, thereby defining a vertical axis 78 along the axis of the shaft 76. The transfer head 74 has a pair of transfer stations 108 and 110 each containing six neck molds 112 (i.e., the same number and in the same arrangement as the preform core pins 50 and the blow core pins 62). The stations 108 and 110 are equally spaced on the circumference of a circle and at diametrically opposite locations with respect to the transfer shaft axis 78.

The transfer portion 34 will be further discussed with reference to FIG. 1 which shows a side view, FIG. 2 which shows a top view and FIGS. 4, 6 and 7 which show different sectional views. The transfer shaft 76 has a lifting hub 80 located in proximity to an upper end 84 and an external spline portion 86 at the lower end 88. The external spline portion 86 is received in an internal spline hub 90 of an index or output shaft 92. The index or output shaft 92 is connected to an indexer or motor 94 which rotates the transfer stations 108 and 110 in 180° increments about the vertical axis 78 to two index positions.

A pair of links 98, running parallel to each other, extend between the blow mold moving platen 58 and an alignment cylinder 100. A cam roller 102 is located on each of the links 98 generally intermediate the two ends 104 and 106 and interposed in the lifting hub 80 of the transfer shaft 76. Movement of the blow mold moving platen 58 moves the first end 104 of the links 98, resulting in the cam roller 102 moving the transfer shaft 76 and the transfer head 74 approximately half the travel of that of the moving platen 58 between a raised transfer position and a lowered operating position (the lowered operating position is shown in FIG. 4). The cam roller 102 retains the transfer head 74 in the proper vertical position, while being capable of riding in the lifting hub 80 to allow the transfer head 74 to be rotated by the indexer 94. The spline portion 86-internal spline hub 90 interface and a collar 107 on a locating head 109 (FIG. 4) maintain the shaft 76 vertically.

The transfer head 74 is capable of moving to the lowered position without concomitant movement of the blow mold moving platen 58 for alignment of the preform mold 36 and stretch blow mold 54 with the neck molds 112. The alignment cylinder 100, which normally acts as a fixed linkage, is stroked by exhausting the cylinder 100, lowering the transfer head 74 to check the alignment of the neck molds 112, as shown in phantom in FIG. 1.

Figure 2:
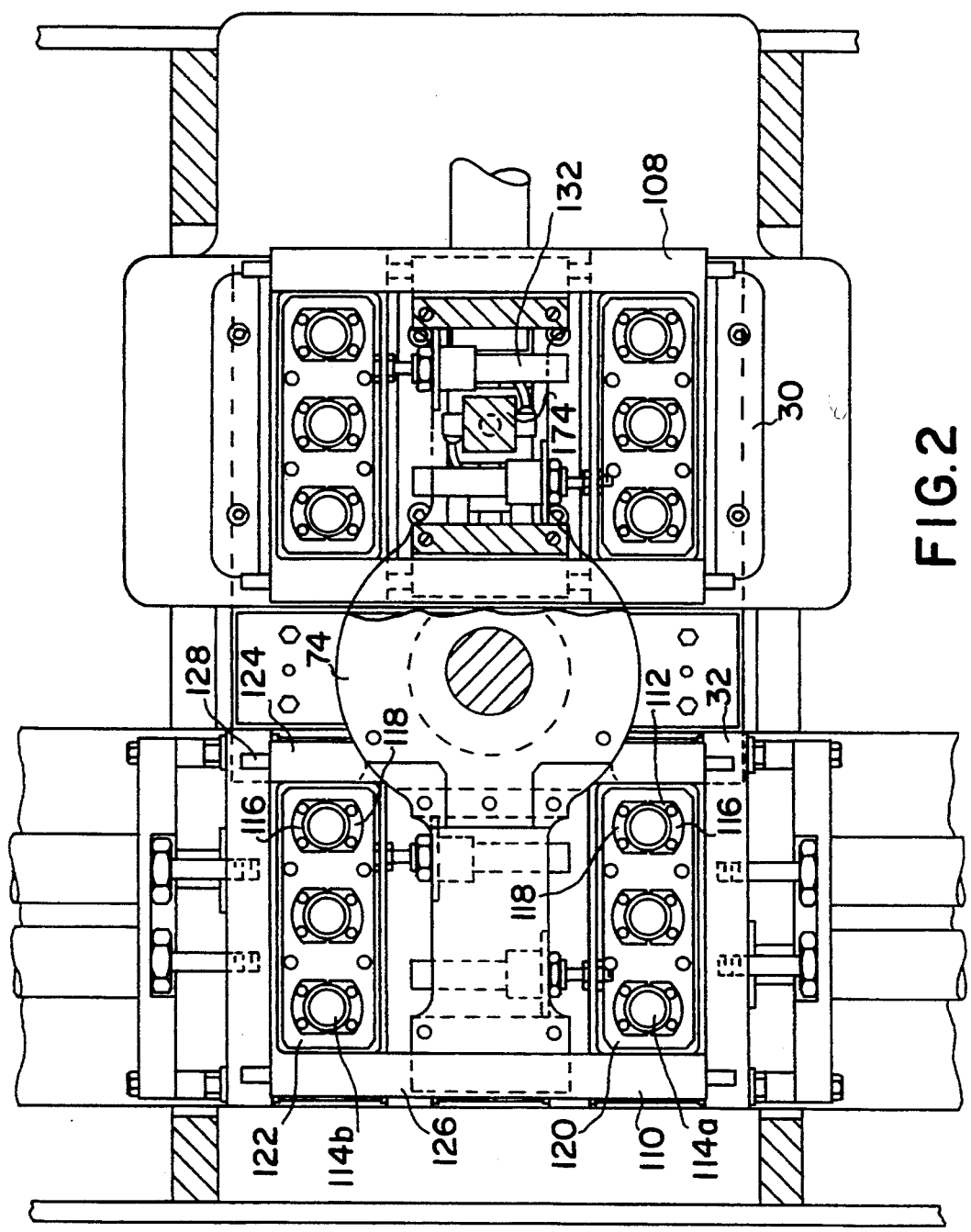
FIG. 2 shows a top view of the transfer head for the apparatus as taken along line 2—2 in FIG. 1.
Figure 3:
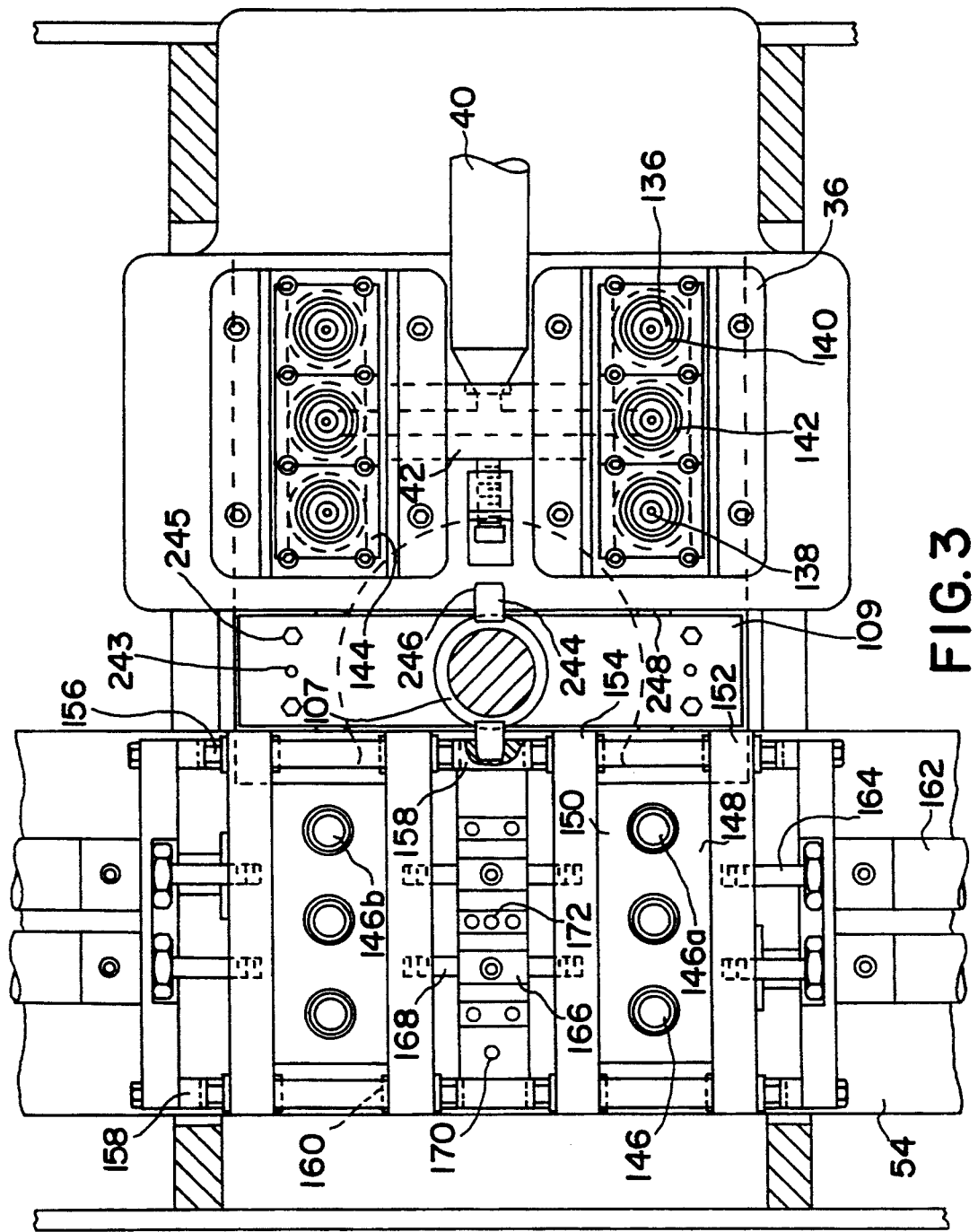
FIG. 3 is a top view of the preform station and the blow mold station as taken along line 3—3 in FIG. 1.

Referring to FIG. 2, the transfer stations 108 and 110 on the transfer head 74 are identical and register with the preform station 30 and the blow mold station 32 when rotated by the indexer motor 94 to the proper aligned position. Each station has six neck molds 112 in two sets of three 114a and 114b. The sets of three are parallel to a radial line from the transfer shaft 76. It is recognized that the stations could have a different number of molds and/or be in a different arrangement. Each neck mold 112 has an outer mold half 116 and an inner mold half 118. The inner mold halves 118 of set 114a are attached to a neck mold holder 120. The outer mold halves 116 of the set 114b are attached to a neck mold holder 122. The mold halves 116 and 118 are each mounted to the neck mold holder 120 or 122, respectively, by a pair of shoulder bolts which allows some movement of the mold halves 116 and 118 relative to the holder to compensate for tolerances which will be discussed below. The neck mold holders 120 and 122 are rigidly connected to each other through a set of neck carriers 124. The outer mold halves 116 of set 114a and the inner mold halves 118 of set 114b are likewise mounted on neck mold holders and connected to each other by a set of neck carriers 126. The neck carriers 124 and 126 are guided by a pair of guide rods 128 therein allowing the outer mold half 116 and the inner mold half 118 to move between a closed engaging position and an open release position (the open release position is shown in FIG. 11). The guide rods 128 are secured to the transfer head 74. A pair of neck mold cylinders 132, mounted on the transfer head 74 and connected to the inner neck mold holders 120, are used to pull the inner mold halves inward. The outer mold halves which are connected by the neck carrier to the inner mold halves of the other set therein is pushed out by the pulling the inner mold halves inward therein resulting in the neck molds opening. A compressed air transfer port 172 (as shown in FIG. 3) projects upward from the stretch blow mold 54 to engage a manifold block 174 (as best seen in FIG. 2) to provide the compressed air for the neck mold cylinders 132. Compressed air is sent to the manifold only when the neck molds need to be open. The neck mold cylinders 132 vent the compressed air to atmosphere upon compressed air no longer being sent to the cylinders 132. A set of compression springs, not shown, located in the neck mold cylinders 132 bias the neck molds to the closed engaging position.

Figure 7:
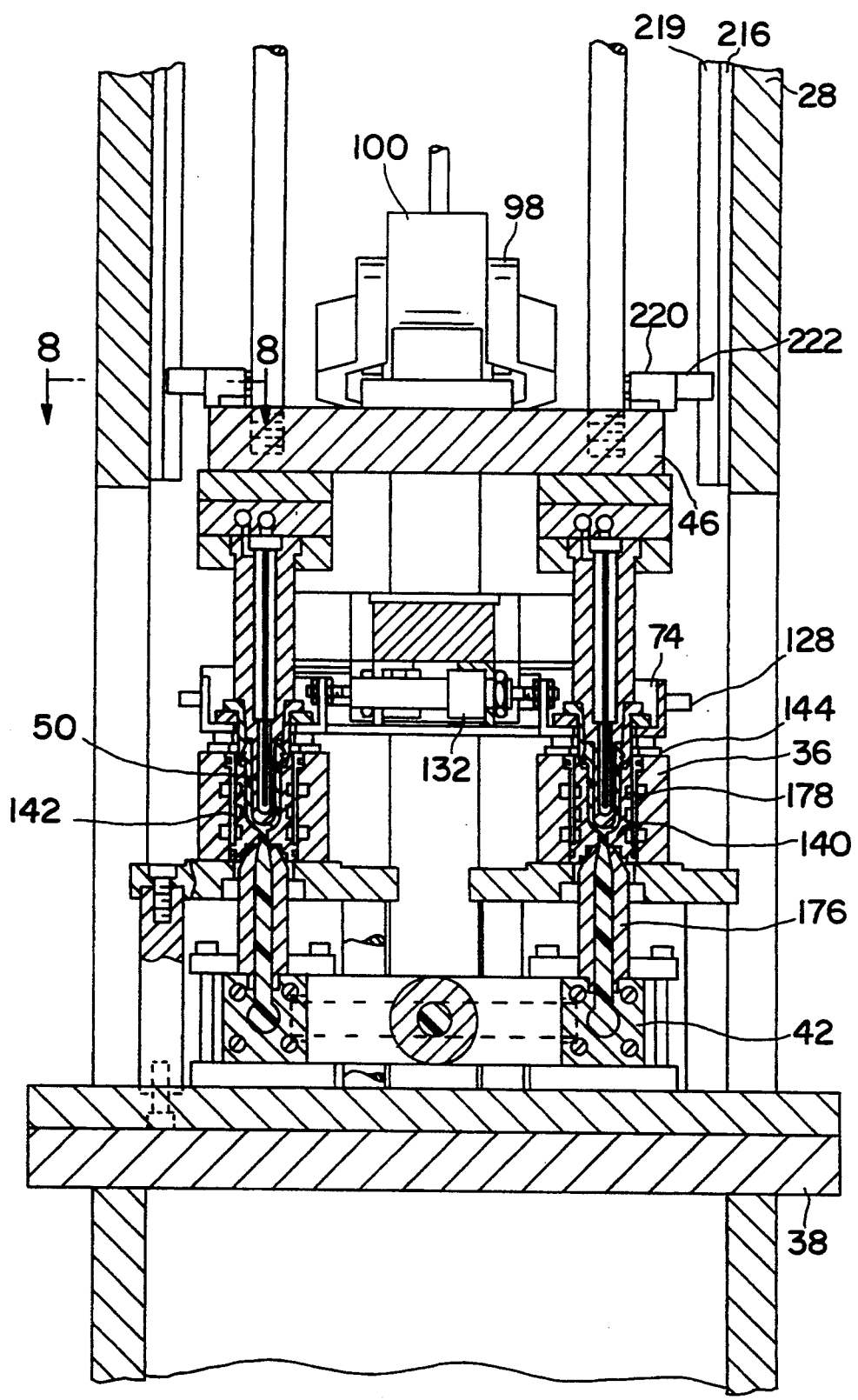
FIG. 7 is a cross-sectional view of the preform station of the apparatus as taken along line 7—7 in FIG. 4.

The preform station 30 will now be fully discussed where FIG. 3 shows a top view of the preform mold 36, and FIGS. 4 and 7 show different sectional views. The preform mold 36 has six injection openings 136 each connected to the manifold 42 by a nozzle 138. The six injection openings 136 align with the neck molds 112 of one of the stations 108 or 110 of the transfer head 74. A preform mold insert 140 defines each of the injection openings 136 and secured to by a mounting plate 144.

A preform nozzle 176 extends upward from the manifold 42 to the preform mold insert 140 and the upper portion of the preform nozzle 176 forms part of nozzle 138. The preform nozzle 176 is heated, similarly to the manifold 42. The preform mold insert 140, on the other hand, is cooled by a water jacket 178, which receives water through line 180. An outer sleeve 142 may be installed to surround the preform mold insert 140 if the insert 140 is designed for a machine with a different preform mold 36 and therefore the adapter outer sleeve 142 is required.

Figure 5B:
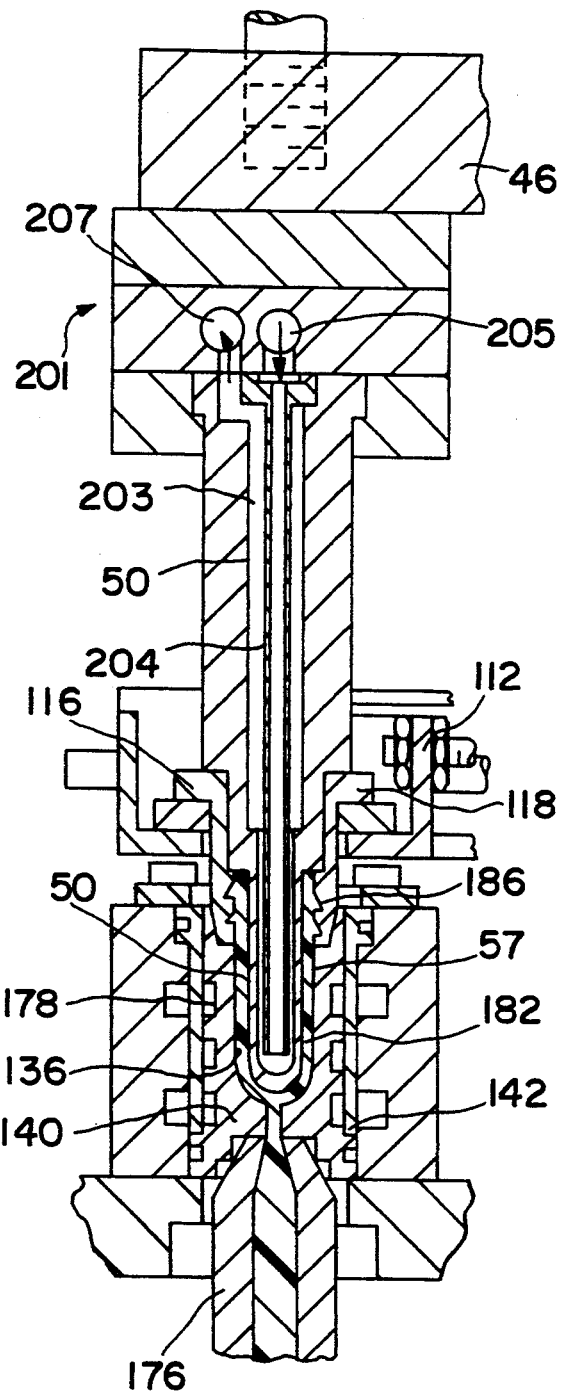
FIG. 5B shows a cross-sectional view of the preform core pin as taken along line 5B—5B in FIG. 5.

The preform core pin 50 extends through the neck mold 112 and is received in the injection opening 136 therein defining a parison cavity 182. The preform core pin 50 has a hollow bore 203 which receives a bubbler tube 204 (as seen in FIG. 5B) wherein coolant, water, flows down the bubbler tube 204 and up around the tube 204 to cool the preform core pin 50. The preform moving platen 46 has a coolant manifold 201 with a coolant "in" duct 205 and a coolant "out" duct 207 (as seen in FIGS. 5B and 7) for transferring coolant to and from the preform core pins 50. Referring to FIG. 6, molded plastic resin is injected through the primary nozzle 40, the manifold 42 and the preform nozzle 176 into the cooled preform mold insert 140. The difference in temperature results in the plastic resin being conditioned to a more rigid state on the preform core pin 50 and being retained by an annular pitched groove 186 on the neck mold 112 (as best seen in FIG. 11) to retain the parison 57 to the neck mold 112.

Figure 5A:
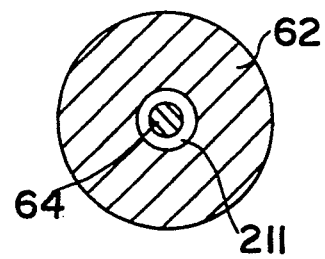
FIGS. 5 and 5A, respectively, show cross-sectional views of the blow core pin as taken along lines 5—5 and 5A—5A, respectively, in FIG. 4.
Figure 5:
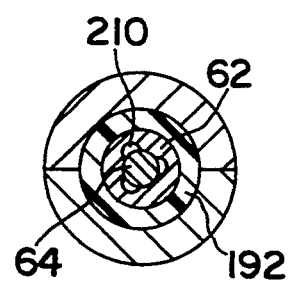
Figure 9:
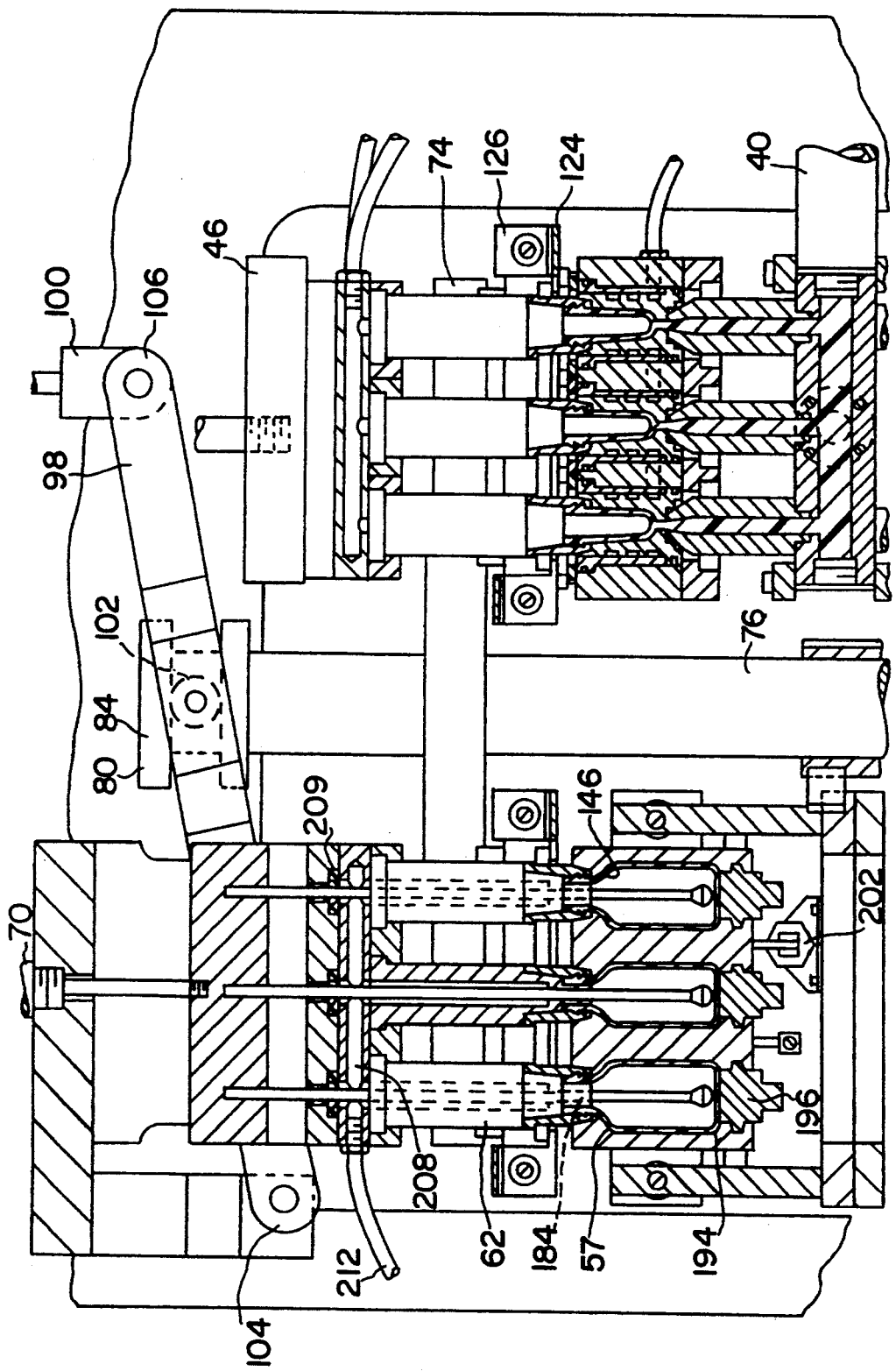
FIG. 9 is a view similar to FIG. 6 with the parison in the blow mold station blown to a hollow-molded product.

The blow mold station 32 will now be fully discussed where FIG. 3 shows a top view of the stretch blow mold 54, FIG. 4 shows a cross sectional view of the station 32, FIGS. 5 and 5A show cross sections of the blow core pin 62, FIG. 6 shows the molding at a point just after stretching and before inflation, FIG. 9 shows the molding at a point after stretching and inflation, and FIG. 11 shows the ejection of finished product.

Referring generally to FIG. 3, the stretch blow mold 54 has six mold cavities 146 in two sets of three 146a and 146b aligned with the neck molds 112 of the other station 108 or 110 of the transfer head 74. Each of the sets 146a and 146b of the mold cavities 146 is defined by a pair of mold halves 148 and 150 mounted on die shoes 152 and 154. The die shoes 152 and 154 are slideably mounted on a pair of leader pins 156 located in a pair of stop plates 158. The movement of the mold halves 148 and 150 and die shoes 152 and 154 are limited by the stop plates 158. The stop plates 158 have a plurality of stops 160 (FIG. 10) which engage the die shoes 152 and 154 to limit the movement of the mold halves 148 and 150 in both a closed position and an open position (FIG. 11). A plurality of outer blow mold open and close cylinders 162 are mounted to the stretch blow mold 54 and each has a rod 164 extending to the die shoe 152. Although four cylinders are shown, that number is not critical. The outer blow mold open and close cylinders 162 move the mold halves 148 between the open and closed position. Stops 160 ensure that the mold halves are in the proper closed or open positions. A pair of inner blow mold open and closed cylinders 166 are located between the die shoes 154 and each has a pair of rods 168 extending to both die shoes 154. The inner blow mold cylinders 166 move both mold halves 150 inward towards the open position and outward towards the closed position. The die shoes 154 are stopped in the proper position by stops 160 located on the stop plates 158.

A tapered alignment pin 170 projects upward from the stretch blow mold 54 to be received by an alignment slot with bushing, not shown, in the transfer head 74 to assure alignment of a selected one of the stations of the transfer head 74 with the blow mold station 32 and concurrently the other station with the preform station 30.

Referring to FIG. 4, the blow core pin 62 of the blow mold moving platen 58 extends into the neck mold 112 when in the lowered position and has a stuffer portion 184 for holding the parison 57 (previously formed at preform station 30) against the neck mold 112. A bottom plug 196 of the stretch blow mold 54, in addition to the mold halves 148 and 150, further defines the mold cavity 146 and shaped to define shape of bottom of hollow-molded product 194. An annular ring 198 of the bottom plug 196 is received by an annular slot 200 of the mold halves 148 and 150 (refer to FIG. 11 to see the slot 200 without the ring 196) to ensure that the bottom plug 196 is properly located and to prevent movement of the bottom plug 196 when the mold cavities 146 are filled with compressed air as described below. A pair of bottom plug operating cylinders 202 (only one is visible in FIG. 4), moves the bottom plugs 196 between a closed position and an open ejection position (as shown in FIG. 11). The bottom plug 196 is pivotally mounted by a rod 228 and connected to the bottom plug operating cylinder 202 by a link 230 for movement between the closed position (FIG. 10) and the open ejection position (FIG. 11). Alternative methods of rotating the bottom plug 196 are recognized, such as a rotary actuator to rotate rod 228.

The blow mold platen 56 and the stretch blow mold 54 each have a slot or opening 206 directly below the bottom plugs 196 for passage of the hollow-molded product 194 upon ejection from the blow mold.

The stretch rods 64 are shown in a partially extended position in FIG. 4, in which stretch rods 64 just touch the parisons 57. The stretch rods 64 extend through a compressed air manifold 208 in the blow mold moving platen 58. Seals 209, lip seals preferably, (FIG. 6) seal the compressed air manifold 208 where the stretch rods 64 pass through the walls. The compressed air manifold 208 is connected to a duct 211 (as best seen in FIG. 5B) which is connected to a series of ducts 210 around the bore for the stretch rod 64, which extend to the stuffer portion 184 of the blow core pins 62, as seen FIG. 5, to provide air to inflate the parison 57, as described below. A compressed air line 212 provides the compressed air for the compressed air manifold 208.

The stretch rods 64 are shown in FIG. 6 in the extended position stretching the parison 57 to engage the bottom plug 196. The stretch rods 64 are moved by the pair of stretch rod cylinders 70 secured to the blow mold moving platen 58, pushing the stretch rod plate 68 and stretch rods 64. The stretch rod cylinders 70 are equipped with a relief function so that after the stretching of the parisons 57 but prior to ejecting the hollow-molded product 194, the force exerted on the stretch rods 64 may be relieved therein relieving the force on the hollow-molded product 194.

Referring to FIG. 9, compressed air enters through the compressed air pipe 212 to the compressed air manifold 208 and down the ducts 211 and 210 (FIGS. 5A and 5) to inflate the parison 57 to the shape of the mold cavity 146 (i.e. the hollow-molded product or bottle 194 having the finished threads 190 on the neck 192). The stuffer portion 184 of the blow core pin 62 seals the parison 57 to allow the inflating operation.

The mold halves 148 and 150 separate (FIG. 11), allowing the bottom plug 196 to rotate down to the open ejection position. The neck mold 112 then is opened and the stretch rod 64 is moved to the ejection position to ensure that the hollow-molded product 194 disengages the blow core pin 62 and does not get hung up on the neck mold 112. The hollow-molded product 194 drops from the mold cavity 146 and through the slot 206 in the blow mold platen 56 and the stretch blow mold 54. FIG. 12 shows a similar view with the stretch rod 64 in the extended position pushing the hollow-molded product 194 out of the mold cavity 164. The neck mold cylinder 132 has pulled the neck mold holders 120 apart therein allowing the hollow-molded product 194 to drop.

Figure 8:
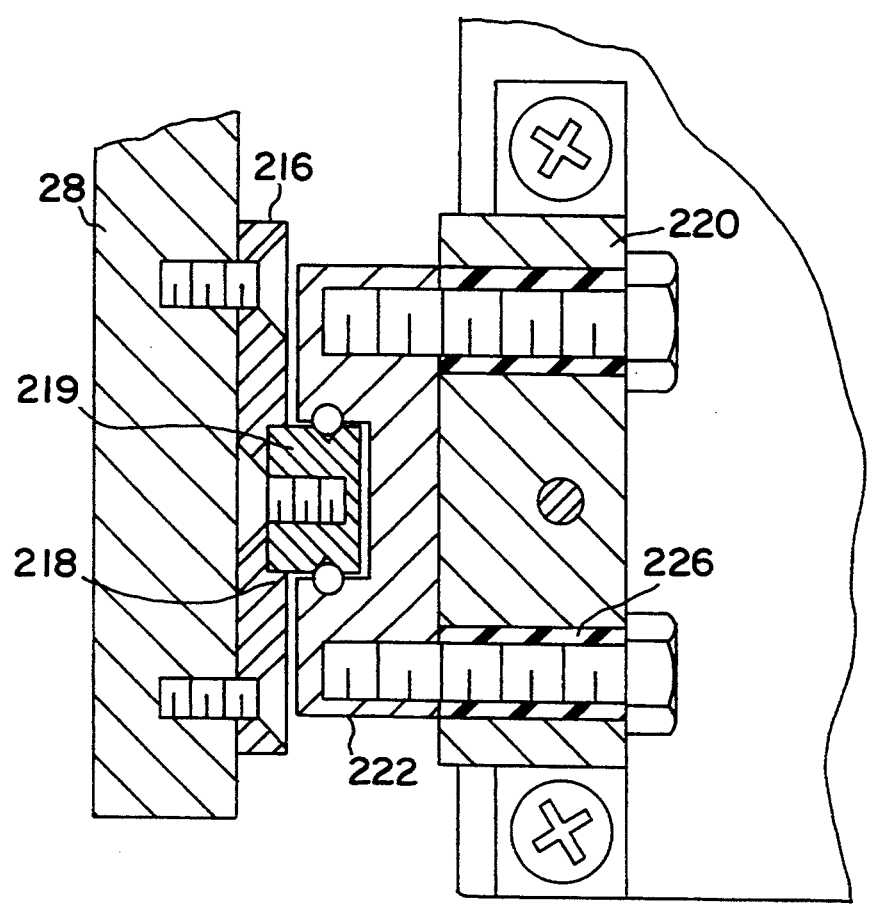
FIG. 8 shows a cross-sectional view of the guiding mechanism as taken along line 8—8 in FIG. 7.

In addition to the components discussed, the injection stretch blow molding machine 26 has additional elements to ensure alignment of components. Referring to FIGS. 7 and 8, a rail 216 extending vertically on the frame 28 receives a rectangular rail 219 in a grooved guide track 218. A bracket 220 mounted to the preform moving platen 46 carries a "U" shaped runner 222. The "U" shaped runner 222 is resiliently mounted on bracket 220 via a pair of flexible ring devices 226 allowing slight flexure. Rail 219 is mounted via a ball slide in runner 222 to guide the preform moving platen 46 as it moves down to the lowered operating position to make sure it remains in alignment with the neck molds 112 and the preform mold 36. The flexible ring devices 226 have some compliance so that any misalignment and binding due to run-out is compensated for by the flexible ring devices 226. The flexible ring devices 226 can compress and/or expand as necessary to account for misalignment or run-out problems.

Figure 10:
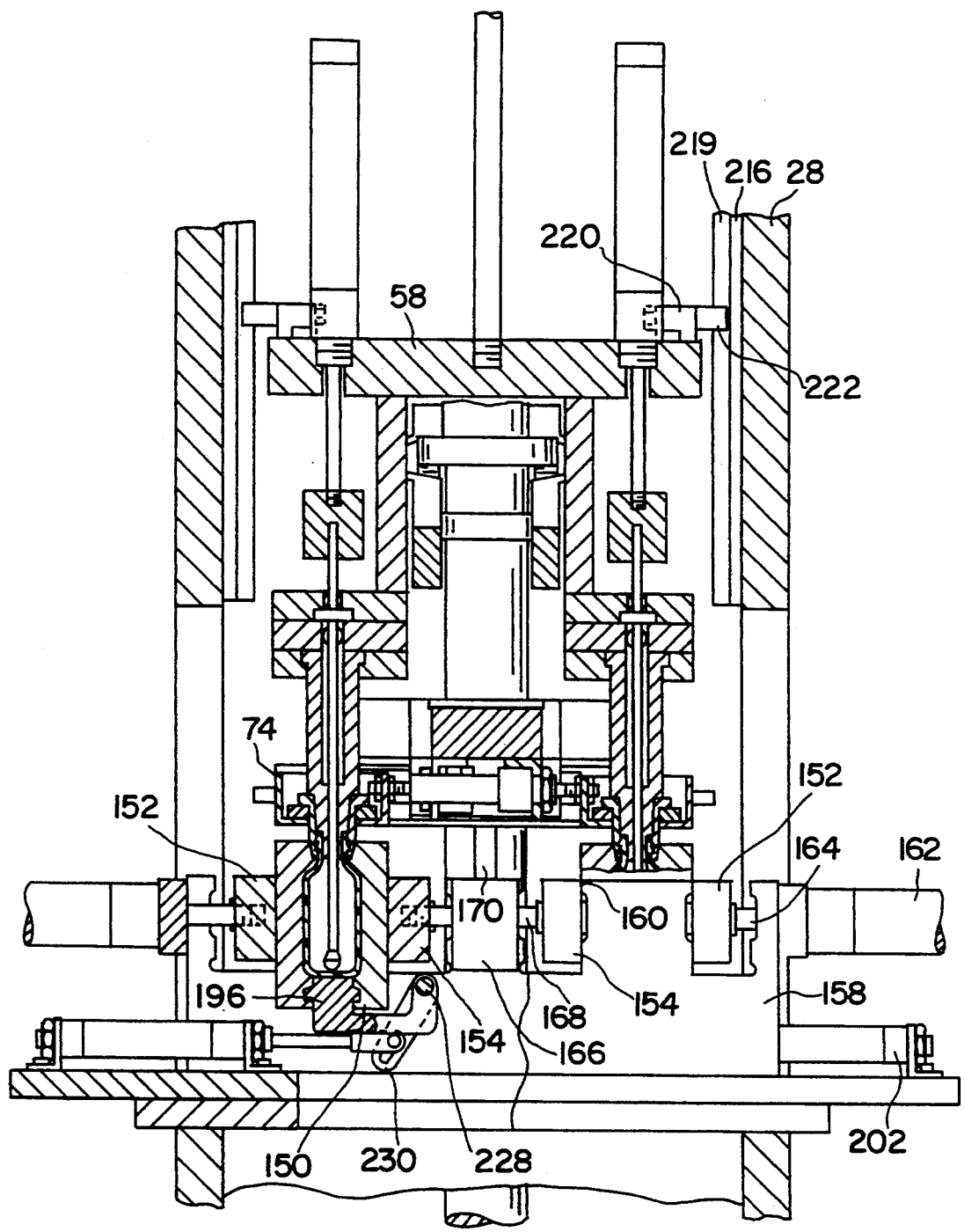
FIG. 10 is a cross-sectional view of the blow mold station for the apparatus as taken along line 10—10 in FIG. 4.

Referring to FIG. 10, the blow mold moving platen 58 similarly has bracket 220 with a resiliently mounted "U" shaped runner 222 and a guide rail 219 mounted via a ball slide to guide the movement of the blow mold moving platen 58 in runner 222 between the raised and lowered position.

Referring to FIGS. 1, 3 and 4, the locating head 109 is a rectangular thick block located on the frame by a pair of dowels 243 and secured by four bolts 245. The locating head 109 has a pair of center keys 244. The center keys 244 each are received by machined grooves 246 in the base of preform mold 36 and the stretch blow mold 54, respectively. In addition, the locating head 109 has two pair of precision ground die stops 248 to engage the bases and precisely radially position the perform mold 36 and the stretch blow mold 54. The center keys 244 and the die stops for the stretch blow mold 54 are located higher vertically than those for the perform mold 36 because of different vertical positions of the base.

In addition, the neck molds 112 are tapered and have a slight amount of free play, the result of being mounted by the shoulder bolts, such that upon the transfer head 74 being lowered to the lowered operating position, the neck molds 112 seat properly in the mounting plates 144 and preform mold inserts 140 of the preform mold 36 and the mold halves 148 and 150 of the stretch blow mold 54.

Description of the Operation

The injection stretch blow molding machine 26 is a continuous cycle machine. The operation of the machine is best understood by starting the discussion at the point in the cycle where both the preform moving platen 74 and the blow moving platen 58 are in the raised position and the transfer portion 20 is in the raised transfer position. At this point of the cycle, both the preform molds and the blow molds are empty. Plastic resin is heated and extruded into the injecting device. The preform moving platen 46 and the blow mold moving platen 58 are moved from the raised position of FIG. 1 to the lowered operating position of FIG. 4 wherein the transfer portion 34 is moved to the lowered operating position by the links 98 and the cam rollers 102 following the blow mold moving platen 58.

Upon the transfer head being lowered, the alignment slot with bushing (not shown) located in the transfer head above the stretch blow mold 54 receives the alignment pin 170 (FIG. 10), moving the transfer head to adjust for any slight misalignment occurring upon the indexer 94 rotating the transfer head 74.

Referring to FIGS. 6 and 7, the molten plastic resin is injected through the primary nozzle 40, the manifold 42 and the preform nozzle 176 into the cooled preform mold insert 140 and into the injection openings 136. The difference in temperature results in the plastic resin being conditioned to a more rigid state on the preform core pin 50 and being retained by the grooves 186 in the neck mold 112 therein forming the parison 57.

After the parison 57 has been formed in the parison cavity 182, the preform cylinders 48 and the blow mold cylinder 60 move the preform moving platen 46 and the blow mold moving platen 58 upward resulting in the transfer head 74 being lifted by the links 98 approximately half the distance as the blow mold moving platen 58. The parisons 57 are held by the groove 186 in each of the neck molds 112 with the neck mold halves 116 and 118 being held together by the compression springs located in the neck mold cylinders 132 (FIG. 2). Since the transfer head 74 and the neck molds 112 are only moving approximately half the travel of the preform moving platen 46, the preform core pins 50 are raised high enough to clear the transfer head 74, the neck molds 112 and parisons 57.

When the moving platens 46 and 58 reach the raised position and the transfer head 74 reaches the raised transfer position, the internal spline hub 90 of the indexer 94 drives the spline 86 of the transfer shaft 76, rotating the transfer head 74 180° about the vertical axis 78 so that the first station 108, which was located at the preform station 30, is now located at the blow mold station 54 and the second station 110, which was located at the blow mold station 54, is now located at the preform station 30, as seen in FIG. 1. The parisons 57 formed at the preform station 30 are now located at the blow mold station 32 and the neck molds 112 at the preform station 30 are empty.

Referring to FIG. 4, the preform cylinders 48 and the blow mold cylinder 60 lower the moving platens 46 and 58 to the lowered position with the transfer head 74 being moved by the links 98 at the same time to the lowered operating position. Simultaneously with plastic resin being injected into the injection opening 136 (FIGS. 6 and 7) as described above, the parisons 57 formed in the previous cycle in the preform station 30, which are now located in the mold cavities 146 of the blow mold station 32, are being axially stretched by the stretch rods 64 (FIGS. 4 and 6). Referring to FIGS. 6, 9 and 10, a stuffer 184 of the blow core pin 62 seals the top of the parison 57 against the neck mold 112. Compressed air is sent through the compressed air manifold 208 and down the ducts 211 and 210 (FIGS. 5A and 5) to inflate the parisons 57 into the shape of the mold cavity 146 forming the hollow-molded product or bottle 194. While operation of the machine has been described with the stretching operation occurring prior to the blowing operation, the stretching and blowing operations can occur simultaneously. The force on the stretch rods 64 is reduced after stretching the parison 57 by the relief function of the stretch rod cylinder 70 so that the stretch rods 64 do not stress the bottom plugs 198 or puncture the hollow-molded product 194 when the stretch blow mold 54 is opening.

Referring to FIGS. 11 and 12, after the parisons 57 are formed at the preform station 30 and as the preform moving platen 46 is moving upward, the mold halves 148 and 150 of the stretch blow mold 54 are moved apart by the blow mold open and close cylinders 162 and 166 (FIG. 3). Prior to the mold halves 148 and 150 opening and after a short curing period, the pressure in the air manifold 208, ducts 211 and 210 and within the hollow-molded product 194 is reduced to atmospheric pressure by venting. The mold halves 148 and 150 move until the die shoes 152 and 154 each engage the stops 160 of the stop plates 58. After the mold halves 148 and 150 have moved to the open position, the bottom plug operating cylinder 202 rotates the linkage 230 moving the bottom plug 196 down and away from the mold cavity 146.

At the same time the transfer head 74 was moved to the lowered operating position, the manifold 174 on the station of the transfer head 74 (FIG. 2) in alignment with the stretch blow mold 54 was lowered onto and in engagement with compressed air transfer 172 (FIG. 2). After the product 194 is formed by stretching and inflating, the short curing period, the venting of pressure and the opening of the blow molds, compressed air is sent through the compressed air transfer 172 to the manifold 174 and into the neck mold cylinders 132 urging the inner mold halves inward against the bias of the springs, therein moving the neck molds to the open release position.

The stretch rod cylinders 70 push the stretch rod plate 68 beyond the extended position to the ejection position resulting in the stretch rods 64 pushing the hollow-molded product or bottle 194 off of the tip of the blow core pin 62. Gravity causes the hollow-molded products or bottles 194 to fall through the slots 206 in the base of the stretch blow mold 54 and blow bottom platen 56 to a conveying means (not shown) which conveys finished products to further operation.

As soon as the stretch rods 64 have pushed the hollow-molded products 194 free, the stretch rod cylinders 70 move the stretch rods 64 and the stretch rod plate 68 upward to the retracted position. The neck mold cylinders 132 vent to atmosphere, the neck mold cylinders 132 are exhausted by the bias force of the compression springs (not shown) moving the neck molds halves 54 and 56 to the closed engaging position. The bottom plug operating cylinder 202 rotates the bottom plug 196 upward to the closed position. The blow mold open and closed cylinders 162 and 166 move the mold halves 148 and 150 towards the closed position. As indicated above, the mold halves 148 and 150 stop moving when the die shoes 152 and 154 contact the stops 160 of the stop plates 158. It is not necessary for both mold halves 148 and 150 to reach the center location at the same time, since the stop plates 158 ensure that the mold halves 148 and 150 will stop at the correct location.

Simultaneous with the stretch rods 64 and the bottom plugs 196 moving, the blow mold moving platen 58 is moved to the raised position by the blow mold cylinder 60. As blow mold moving platen 58 is raised, the manifold 174 located in the transfer head 74 (FIG. 2) separates from the compressed air transfer 172. However prior to this separation, the neck mold cylinders 132 have vented to atmosphere and the compression springs (not shown) have moved the neck molds halves 54 and 56 to the closed engaging position. With the blow mold moving platen 58 and the preform moving platen 46 in the raised position and the transfer head 74 moved by the links 98 to the raised transfer position, the indexer 94 is ready to rotate the transfer head 74 180° about the vertical axis 78 so that the parisons 57 formed at the preform station 30 are moved to the blow mold station 32 and the now empty neck molds 112 are moved from the blow mold station 32 to the preform station 30. The transfer head 74, the preform moving platen 46 and the blow mold moving platen 58 are lowered again to continue the process.

Pre-operation Alignment

Prior to operation, the machine 26 may require adjustment to ensure alignment and to ensure that the proper amount of plastic resin is received in each of the injection openings 136 at preform station 30. The amount of plastic resin received in the injection opening 136 is varied using different preform mold inserts 140 and preform nozzles 176. An unique feature of the invention is that both are removable and replaceable through the top of the preform mold 36 through the removable mounting plates 144. In addition, the transfer head 74 can be lowered to the lowered operating position to check alignment without lowering the blow mold moving platen 58, by lowering the alignment cylinder 100 as shown in phantom in FIG. 1.

Alternative Embodiments

Figure 13:
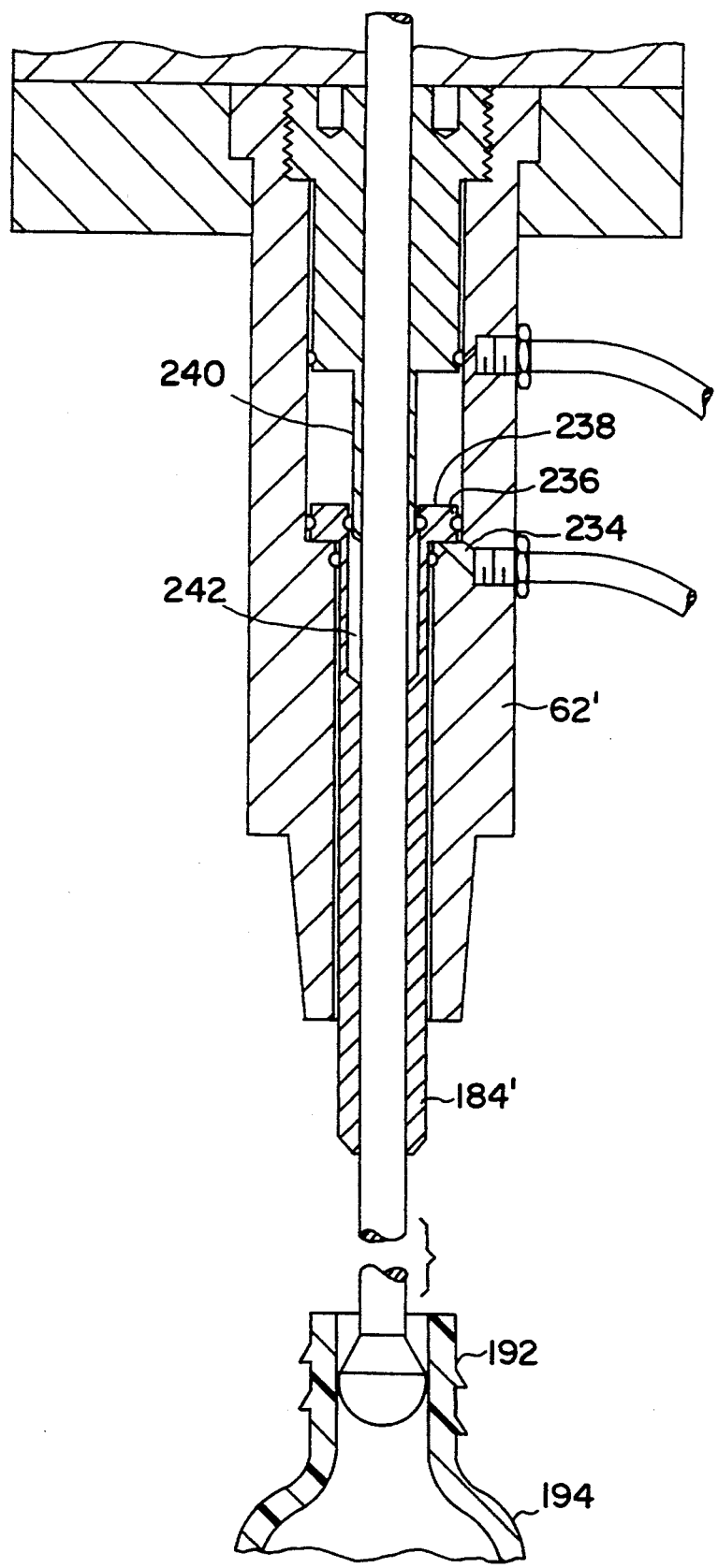
FIG. 13 is a cross-sectional view of an alternative embodiment of the blow core pin.

FIG. 13 shows an alternative embodiment of the blow core pin 62'. The stuffer portion 184' is a slidable piece relative to the rest of the core pin 62' and located in the blow core pin 62'. Upon the hollow-molded product 194 being formed, the stuffer portion 184' moves upward out of the neck 192 of the product 194. This action is achieved by compressed air being forced on a lower side 234 of an upper plate 236 of the stuffer portion 184', while air is exhausted from an upper portion 238. The stuffer portion 184' is typically held in the extended position by compressed air above the upper plate 236. A sleeve 240 is slideably received by a chamber 242 in the stuffer portion 184' to allow air to pass through the ducts 210 (FIG. 5) therein the air to inflate the parison 57 into the hollow-molded product 194 does not mix and interfere with the compressed air to move the stuffer portion.

Figure 14:
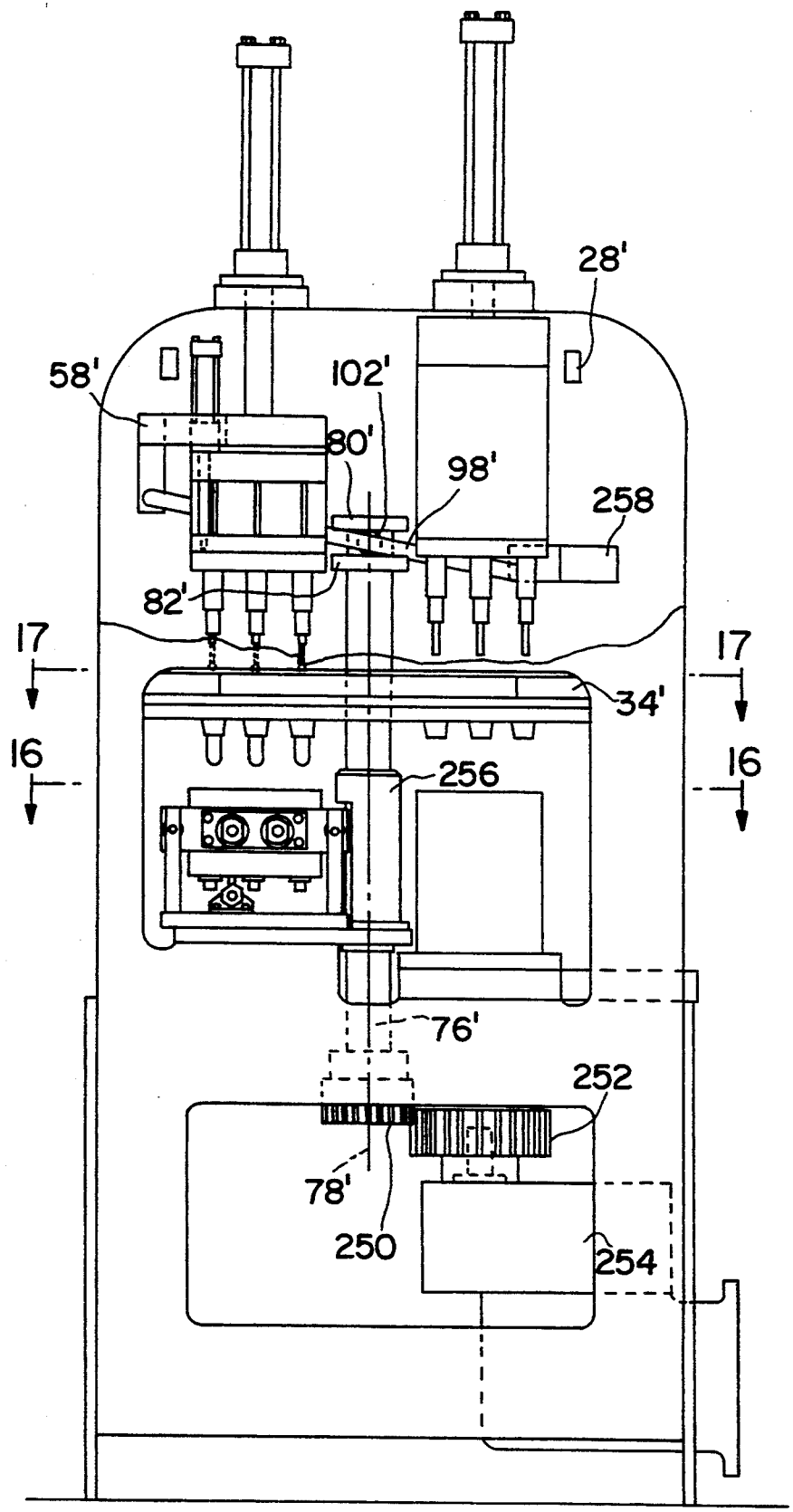
FIG. 14 is a side elevation of an alternative embodiment of the transfer drive mechanism.

Referring to FIG. 14, an alternate embodiment to rotate the transfer portion 34' is shown. The transfer shaft 76' has a drive gear 250 at the lower end. A drive gear 252 connected to an indexer or drive means 254 constantly engages the drive gear 250 of the transfer portion 34' allowing the indexer 254 to rotate the transfer head 74 to the pair of aligned positions located 180° from each other about the vertical axis 78'. A collar 256 located on the blow bottom platen 56' maintains the shaft 76' vertically.

The pair of links 98' can extend from the blow mold moving platen 58' to a block 258 secured to the frame 28' instead of the alignment cylinder 100 shown in FIG. 1. To move the transfer head 74' without moving the blow mold moving platen 58' would require the disconnection of the links 98' from the block 258.

The transfer head 74' moves in a manner similar to that of the first embodiment, with the cam rollers 102' interposed in a lifting hub 80' of the transfer shaft 76'. Movement of the blow mold moving platen 58' would move the transfer head 74'. The drive gear 250 would move axially relative to the drive gear 252, but it would maintain constant engagement.

Figure 15:
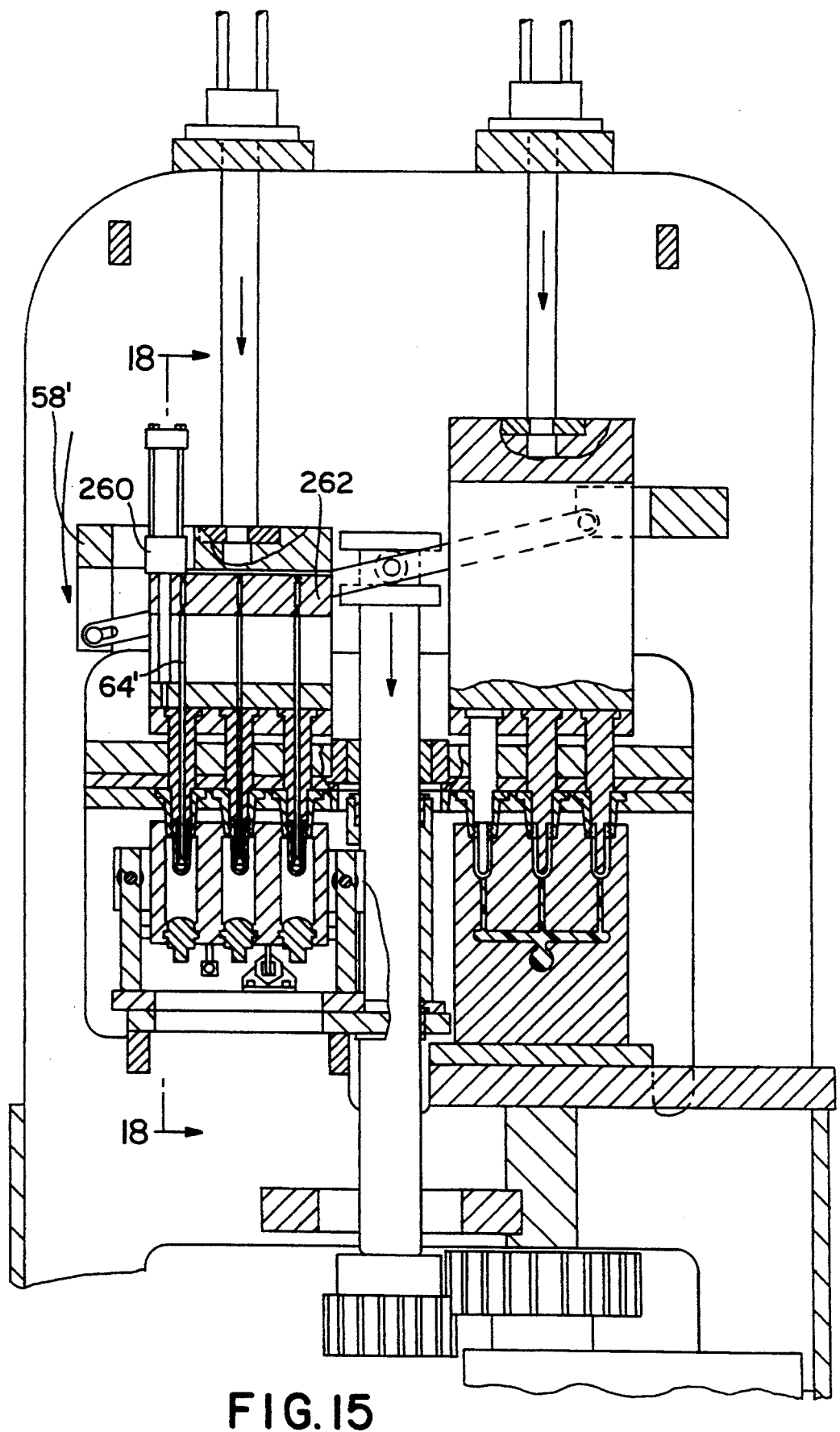
FIG. 15 is a section of the top portion of the machine showing an alternative embodiment of the stretch rod mechanism.
Figure 18:
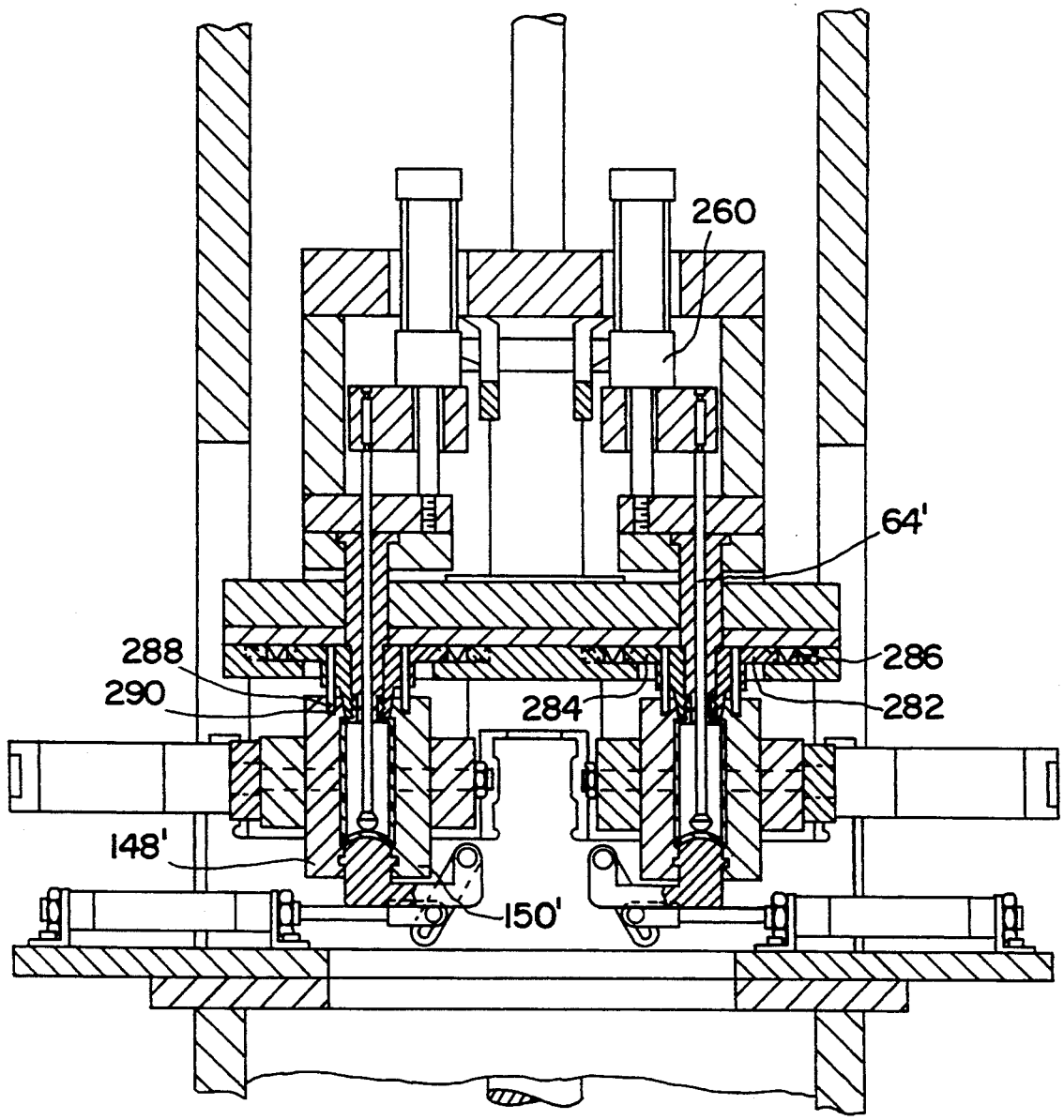
FIG. 18 is a cross-sectional view of the blow mold station for an alternative embodiment as taken along line 18—18 in FIG. 15.

Referring to FIG. 15, an alternative method of moving the stretch rods 64' is shown. Similar to FIG. 1, a stretch rod cylinder 260 extends between a stretch rod plate 262 and the blow mold moving platen 58'. However, the housing of the stretch rod cylinder 260 is mounted to the stretch rod plate 262 and the rod extends to the lower portion of the blow mold moving platen 58'. Instead of the stretch rod cylinder 70 (of FIG. 1) extending to move the stretch rods 64 downward, the stretch rod cylinder 260 contracts, thereby moving the stretch rod plate 262 and stretch rod cylinder 260 downward towards the lower plate of the blow mold moving platen 58'. Downward movement of the stretch rod plates extends the stretch rods 64'. FIG. 18 shows a side view of the alternative embodiment of the stretch rod 64'.

Figure 16:
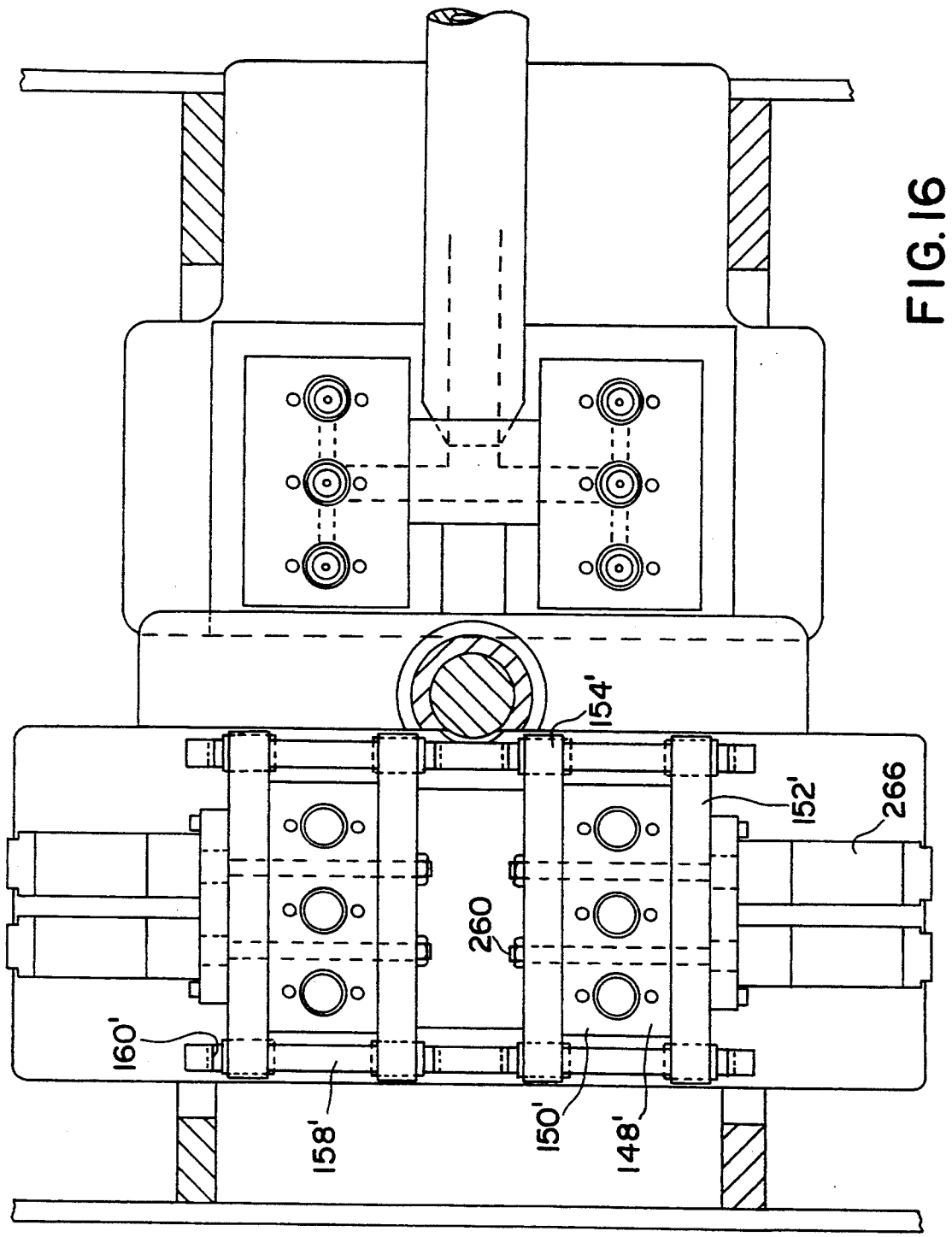
FIG. 16 is a top view of the preform station and the blow mold station of an alternative embodiment as taken along line 16—16 in FIG. 14.
Figure 19:
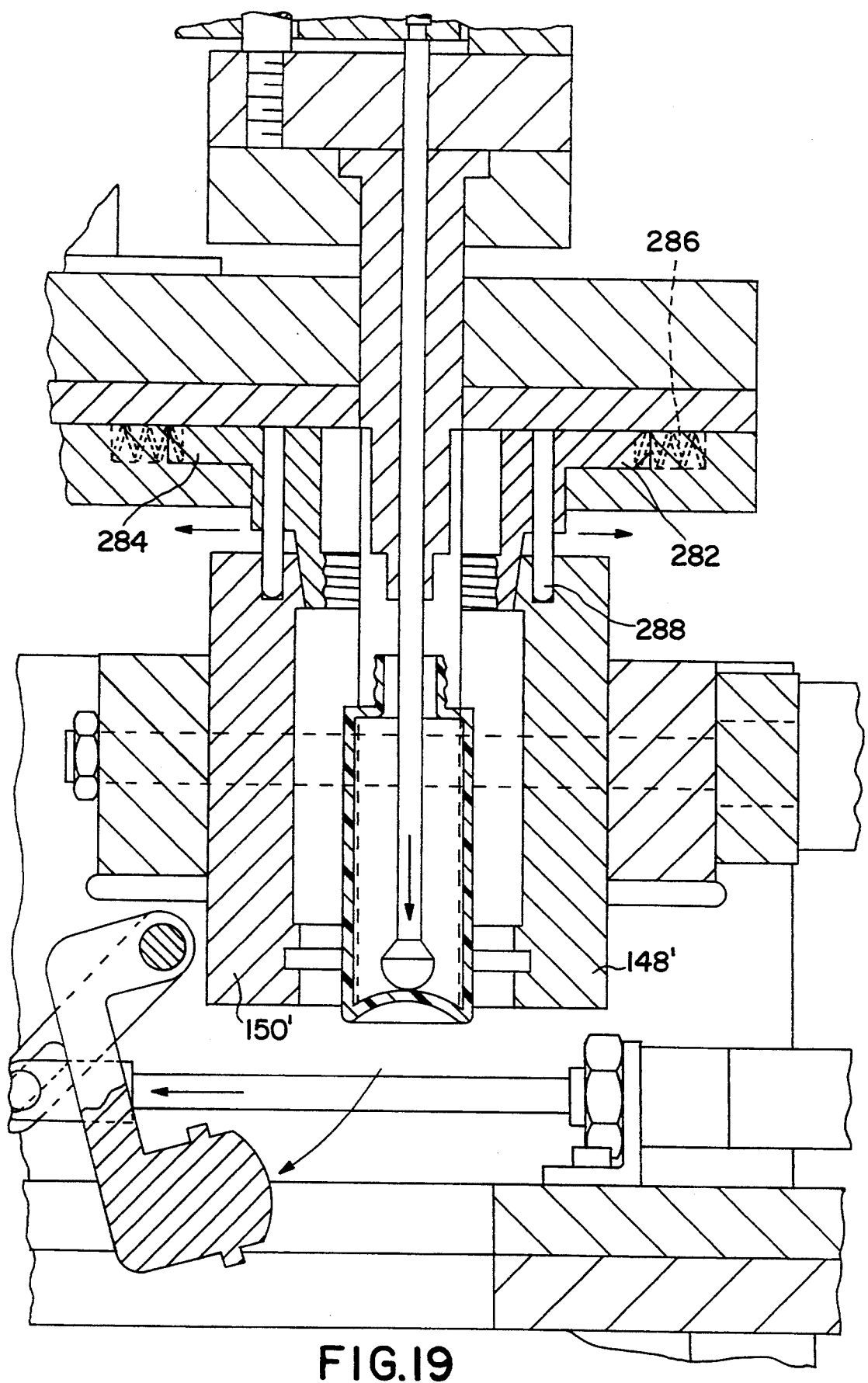
FIG. 19 is an enlarged section view of ejecting the hollow-molded product from one of the blow molds in the blow mold station.

FIG. 16 shows an alternative embodiment to the stretch blow mold 54'. Four blow mold open and close cylinders 266 are mounted to the outer die shoe 152' and each has a rod 268 that extends through the mold halves 148' and 150' to the inner die shoe 154'. The cylinders 266 move the mold halves 148' and 150' between the closed position wherein the halves 148' and 150' engage each other and an open position (FIG. 19). Similar to the first embodiment, movement of the mold halves 148' and 150' is limited by the stops 160' of the stop plates 158', therefore as the cylinder 266 moves the mold halves 148' and 150' apart or together, upon the die shoe 152' engaging the stop plates 158' the mold half 148' stops moving. The other mold half 150' moves independently of mold half 148' until the die shoe 154' reaches a stop 160'.

Figure 17:
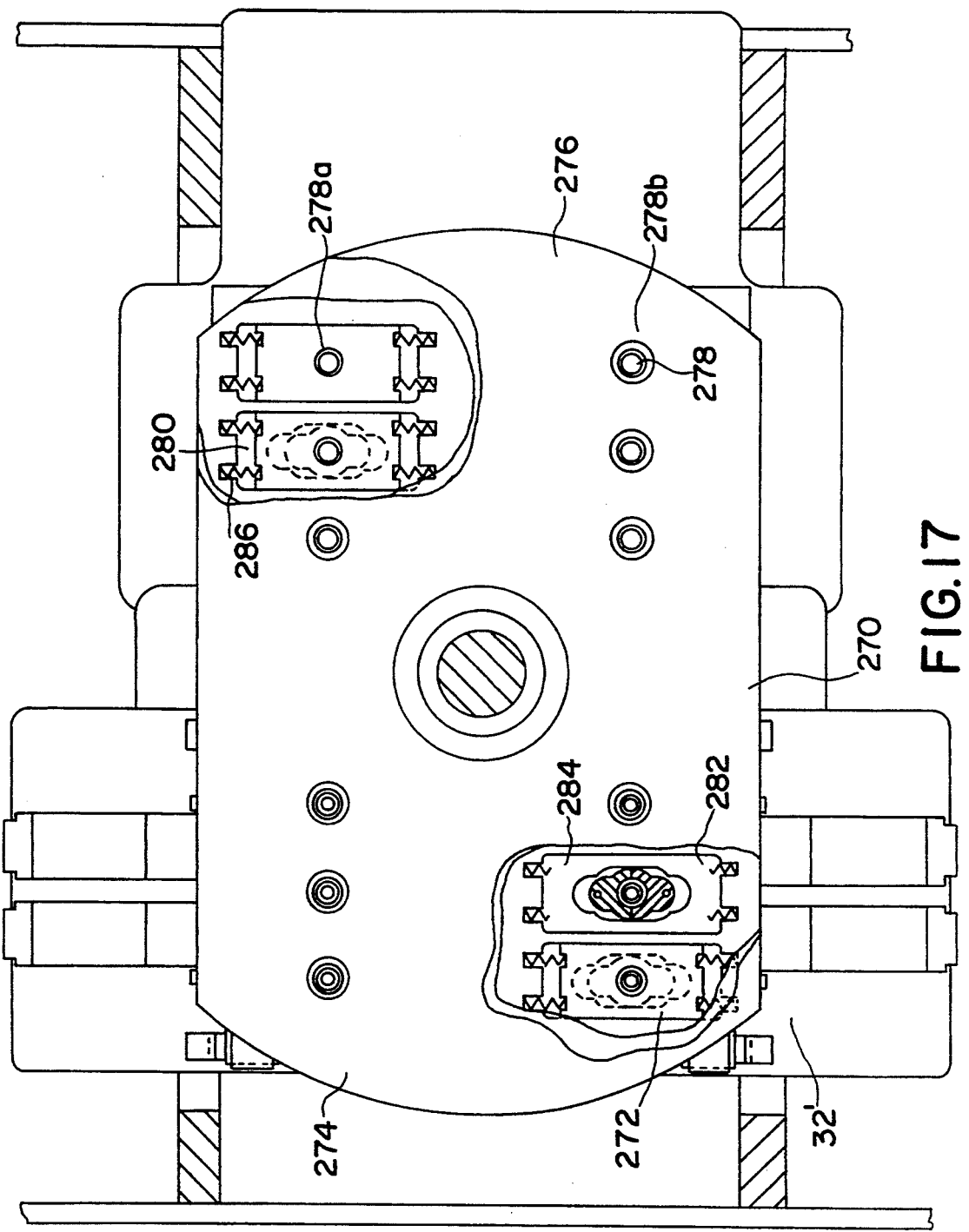
FIG. 17 is a top view of the transfer head for an alternative embodiment as taken along line 17—17 in FIG. 14.

Referring to FIG. 17, an alternative embodiment of a transfer head 270 and neck molds 272 is shown. The transfer head 270 has two stations 274 and 276 each having six bores 278 located in two rows of three 278a and 278b wherein each row is generally parallel to a radius from the vertical axis and aligned with the mold cavities 146' of the blow mold station 32' and the injection openings 136' of the preform station 30'. The neck molds 272 are located in a channel 280 of the transfer head 270 and have two mold halves 282 and 284 biased by compression springs 286 to the closed position. Referring to FIG. 18, the mold halves 282 and 284 have alignment pins 288 which depend downward and each are received by an opening 290 in the mold halves 148' and 150' in the stretch blow mold 54' and in the other station received in holes in the preform mold 36'. Referring to FIG. 19, when the mold halves 148' and 150' are opened by the blow mold open and close cylinder 66', the neck molds are urged open by the alignment pins against the bias of the compression spring 286.

The present invention may be embodied in other specific forms without departing from the spirit or essential attributes thereof and, accordingly, reference should be made to the appended claims, rather than to the foregoing specification, as indicating the scope of the invention.

In brief summary, and referring to FIG. 1, the injection stretch blow molding machine 26 forms parisons 57 in the preform mold 36. The parisons 57 are retained in the neck mold 112 of the transfer head 74. The transfer head 74 is raised with the blow mold moving platen 58 via the links 98 to a raised transfer position allowing the indexer 94 to rotate the parisons 57 from a position aligned with the preform station to a position aligned with the blow mold station 32. The transfer head 74 is lowered therein lowering the parsons 57 into the blow mold cavities 146. The blow core pins 62 seal the parison 57 in the neck molds 112 and blow mold cavities 146. The stretch rods 64 move to the extended position stretching the parison. The parison is inflate to form the finished hollow-molded product. The mold halves move to the open position, the bottom plug rotates to the open ejection position. The neck mold move to the open position and the ejection rods move to the ejection position ejecting the hollow-molded product. Simultaneous to the blow mold station 32 forming and ejecting the hollow-molded product, the other station of the transfer head, which is at a diametrically opposite location on the transfer head is in registry with the preform station is retaining newly formed parisons 57.

I claim:

1. A machine for forming hollow molded products by injection stretch blow molding, comprising:

a preform station for forming a parison;

a blow mold station for stretching and inflating the parison into the hollow molded product and then ejecting the hollow-molded product from the machine;

the preform station and the blow mold station being positioned at diametrically opposite locations on a circumference of a circle;

a transfer portion having a transfer head rotatable about an axis extending through the center of the circle and having a pair of identical transfer stations located at diametrically opposite locations with respect to the axis;

indexing means for rotating the transfer head between two aligned positions in which one of the transfer stations is in registry with the preform station and the other transfer station is in registry with the blow mold station;

each transfer station having at least one parison engaging and retaining means for engaging the parison formed at the preform station and retaining the parison for transfer from the preform station to the blow mold station upon rotation of the transfer portion from one to another of the two positions;

adjustment means for moving the transfer head between a raised transfer position for rotating the transfer head between the aligned positions and a lowered operating position for forming the parison and the hollow-molded product;

the preform station having a preform mold below the transfer head having an injection opening aligned with each of the parison engaging and retaining means of the aligned station of the transfer head and the preform station having a preform moving platen movable between a raised position and a lowered position and having a preform core pin depending downward and extending through the transfer head and into each of the injection openings when the transfer head and the preform moving platen are in the lowered position for forming the parison retained by the parison engaging and retaining means; and the blow mold station having a stretch blow mold below the transfer head having a mold cavity aligned with each of the parison engaging and retaining means of the aligned station of the transfer head for receiving the parison and forming the hollow-molded product, and the blow mold station having a blow mold moving platen movable between a raised position and a lowered position and having a blow core pin depending downward to extend through the transfer head and to seal the parison in the parison engaging and retaining means and each blow core pin having a stretch rod extending through a bore, the stretch rods movably mounted to the blow mold moving platen for movement between a retracted position, an extended position for stretching the parison and an ejection position for ejecting the hollow-molded product, wherein the stretch rod stretches the parison in the mold cavity and the blow core pin blows the parison into the hollow-molded product and then the hollow-molded product is ejected from the machine.

2. A machine for forming hollow molded products by injection stretch blow molding, comprising:

a preform station for forming a parison;

a blow mold station for stretching and inflating the parison into the hollow molded product and then ejecting the hollow-molded product from the machine;

the preform station and the blow mold station being positioned at diametrically opposite locations on a circumference of a circle;

a transfer portion having a transfer head rotatable about an axis extending through the center of the circle and having a pair of identical transfer stations located at diametrically opposite locations with respect to the axis;

indexing means for rotating the transfer head between two aligned positions in which one of the transfer stations is in registry with the preform station and the other transfer station is in registry with the blow mold station;

each transfer station having at least one parison engaging and retaining means for engaging the parison formed at the preform station and retaining the parison for transfer from the preform station to the blow mold station upon rotation of the transfer portion from one to another of the two positions;

adjustment means for moving the transfer head between a raised transfer position for rotating the transfer head between the aligned positions and a lowered operating position for forming the parison and the hollow-molded product;

the preform station having a preform mold below the transfer head having an injection opening aligned with each of the parison engaging and retaining means of the aligned station of the transfer head and the preform station having a preform moving platen movable between a raised position and a lowered position and having a preform core pin depending downward and extending through the transfer head and into each of the injection openings when the transfer head and the preform moving platen are in the lowered position for forming the parison retained by the parison engaging and retaining means;

the blow mold station having a stretch blow mold below the transfer head having a mold cavity aligned with each of the parison engaging and retaining means of the aligned station of the transfer head for receiving the parison and forming the hollow-molded product, and the blow mold station having a blow mold moving platen movable between a raised position and a lowered position and having a blow core pin depending downward to extend through the transfer head and to seal the parison in the parison engaging and retaining means and each blow core pin having a stretch rod extending through a bore wherein the stretch rod stretches the parison in the mold cavity and the blow core pin blows the parison into the hollow-molded product and then the hollow-molded product is ejected from the machine; and the stretch blow mold having at least one set of the blow mold cavities defined by a pair of mold halves wherein the mold halves move between a closed position engaging each other for stretching and blowing the parison into the hollow-molded product and an open position for ejecting the hollow-molded product and the stretch blow mold having a bottom plug rotatable between a closed position located between the mold halves and an open position spaced from the mold halves for ejecting the hollow-molded product.

3. A machine as in claim 2 wherein the stretch blow mold has a stop means for limiting the movement of each of the mold halves in both the closed position and the open position.

4. A machine as in claim 2 wherein the stretch blow mold has a pair of stop plates, a die shoe mounted to each of the mold halves, a pair of leader pins carried by the stop plates slideably receiving the die shoes for guiding the movement of the mold halves, and the stop means are stops machined on the stop plates for engaging the die shoes.

5. A machine for forming hollow molded products by injection stretch blow molding, comprising:
a preform station for forming a parison;
a blow mold station for stretching and inflating the parison into the hollow molded object and then ejecting the hollow-molded product from the machine;
the preform station and the blow mold station being positioned at diametrically opposite locations on a circumference of a circle;
a transfer portion having a transfer head rotatable about an axis extending through the center of the circle and having a pair of identical transfer stations located at diametrically opposite locations with respect to the axis, and the transfer portion having a transfer shaft extending through the transfer head;
indexing means for rotating the transfer head between two aligned positions in which one of the transfer stations is in registry with the preform station and the other transfer station is in registry with the blow mold station, and the transfer shaft having coupling means at an end for coupling with the indexing means and a lifting hub located in proximity to the other end;

each transfer station having at least one parison engaging and retaining means for engaging the parison formed at the preform station and retaining the parison for transfer from the preform station to the blow mold station upon rotation of the transfer portion from one to another of the two positions;

the preform station having a preform mold below the transfer head having an injection opening aligned with each of the parison engaging and retaining means of the aligned station of the transfer head and the preform station having a preform moving platen movable between a raised position and a lowered position and having a preform core pin depending downward and extending through the transfer head and into each of the injection openings when the transfer head and the preform moving platen are in the lowered position for forming the parison retained by the parison engaging and retaining means;

the blow mold station having a stretch blow mold below the transfer head having a mold cavity aligned with each of the parison engaging and retaining means of the aligned station of the transfer head for receiving the parison and forming the hollow-molded product, and the blow mold station having a blow mold moving platen movable between a raised position and a lowered position and having a blow core pin depending downward to extend through the transfer head and to seal the parison in the parison engaging and retaining means and each blow core pin having a stretch rod extending through a bore wherein the stretch rod stretches the parison in the mold cavity and the blow core pin blows the parison into the hollow-molded product and then the hollow-molded product is ejected from the machine; and a link having a first end mounted to the blow mold movable platen and a second end selectively rigidly positioned relative to the preform mold in proximity to the preform moving platen, and a cam roller rotatably mounted on the link sustantially intermediate the ends and slideably received by the lifting hub on the transfer shaft so that the transfer head moves between the raised position and the lowered position with the blow molded movable platen.

6. A machine as in claim 5 wherein the second end of the link is secured to an alignment cylinder wherein the cylinder moves the second end of the link from a normal operating position to a lower pre-operation alignment position.

7. A machine as in claim 5 wherein the coupling means is the transfer shaft having a spline received by an internal spline hub of the indexing means.

8. A machine for forming from a plastic resin a parison and then stretch blowing into a hollow-molded product, comprising:
a frame;
a transfer portion having a substantially horizontal transfer head and a transfer shaft extending vertically through the transfer head defining a vertical axis and having an indexing gear means at a lower end and a lifting hub located in proximity to an upper end and the transfer head having a pair of identical stations located 180° from each other about the vertical axis and equally spaced radially from the vertical axis;

indexing means for rotating the transfer head between a pair of two aligned positions 180° apart relative to the vertical axis;

the stations of the transfer head each having a plurality of neck molds for retaining the parison, each neck mold having two halves for moving between a closed position and an open position for ejecting the hollow-molded product;

a preform station aligned with one of the stations of the transfer head when the transfer head is in one of the aligned positions for forming a parison from the plastic resin and having a preform mold mounted to the frame below the transfer head and a preform moving platen carried by the frame and movable between a raised position and a lowered position, the preform mold having an injection opening aligned with each of the neck molds of the aligned station of the transfer head and the preform mold having a preform core pin depending downward to extend between the neck halves of the neck mold in the closed position and into the injection opening when the transfer head and the preform moving platen are in the lowered position for forming the parison retained by the neck mold;

a blow mold station aligned with the other station of the transfer head when the transfer head is in the one of the aligned positions for stretching, blowing the parison into the hollow-molded product and then ejecting the hollow-molded product from the machine and having a stretch blow mold mounted to the frame below the transfer head and a blow mold moving platen carried by the frame and movable between a raised position and a lowered position, the stretch blow mold having a pair of mold halves defining a mold cavity aligned with each of the neck molds for receiving the parison wherein the mold halves move between a closed position engaging each other for stretching and blowing the parison into the hollow-molded product and an open position for ejecting the hollow-molded product, the blow mold moving platen having a blow core pin depending downward between the neck mold halves to seal the parison in the neck mold and each blow core pin having a stretch rod extending through a bore and movably mounted to the blow mold moving platen for movement between a retracted position, an extended position for stretching the parison and an ejected position for ejecting the hollow-molded product wherein the stretch rod stretches the parison and the blow core pin blows the parison into the hollow-molded product and then hollow-molded product is ejected from the machine; and vertical adjustment means having a pair of links, each having mounted at a first end to the blow mold movable platen and at a second end selectively rigidly positioned relative to the frame in proximity to the preform moving platen, and a cam roller rotatably mounted on the link substantially located intermediate the ends and slideably received between by the lifting hub on the transfer shaft for moving the transfer head between the raised transfer position and the lowered operating position with the blow mold movable platen wherein the parison formed at the preform station is transferred to the blow mold station by the neck mold for stretching, and blowing into the hollow-molded product and then ejecting.

9. A machine as in claim 8 wherein the stretch blow mold has a stop means for limiting the movement of each of the mold halves in both the closed position and the open position.

10. A machine as in claim 9 wherein the stretch blow mold has a pair of stop plates, a die shoe mounted to each of the mold halves, a pair of leader pins carried by the stop plates slideably receiving the die shoes for guiding the movement of the mold halves, and the stop means are stops machined on the stop plates for engaging the die shoes.

11. A machine as in claim 8 wherein the stretch blow mold has a second pair of mold halves defining a mold cavity wherein the mold halves are parallel to each other, and an inner blow mold cylinder for moving the adjacent mold halves of both pair and a pair of outer blow mold cylinder for moving the other mold halve from each pair.

12. A machine as in claim 8 wherein the neck molds halves are moved apart by a cylinder carried on the transfer head.

13. A machine as in claim 8 wherein the perform mold includes means for regulating temperature.

14. A machine as in claim 8 wherein the frame has a slot for the ejected hollow-molded product to pass through.

15. A machine as in claim 8 wherein the blow mold moving platen and the preform moving platen each have a bracket slideably received by a track carried by the frame for guiding the moving platens between the raised position and the lowered position.

16. A machine as in claim 8 wherein each blow core pin has a stuffer portion for sealing the parison in the neck mold and the stuffer portion is slideably relative to the blow core pin for movement of the stuffer portion out of the hollow-molded product.

17. A machine as in claim 8 wherein the frame has a locating head having a pair of center keys and a plurality of stops, the preform mold and the stretch blow mold each having a groove for receiving one of the center keys for positioning the mold and each mold engaging a plurality of stops for positioning the mold radially.

* * * * *